United States Patent
Tabata et al.

(10) Patent No.: US 9,325,112 B2
(45) Date of Patent: Apr. 26, 2016

(54) CONNECTOR DEVICE

(71) Applicant: Japan Aviation Electronics Industry, Limited, Tokyo (JP)

(72) Inventors: Yuya Tabata, Tokyo (JP); Yuichiro Nakamura, Tokyo (JP); Akira Kuwahara, Tokyo (JP); Yuji Kamei, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 20 days.

(21) Appl. No.: 14/449,460

(22) Filed: Aug. 1, 2014

(65) Prior Publication Data

US 2015/0064954 A1    Mar. 5, 2015

(30) Foreign Application Priority Data

Sep. 3, 2013 (JP) ................................. 2013-182315

(51) Int. Cl.
*H01R 13/629* (2006.01)
*H01R 13/641* (2006.01)

(52) U.S. Cl.
CPC ...... *H01R 13/62966* (2013.01); *H01R 13/6295* (2013.01); *H01R 13/62905* (2013.01); *H01R 13/641* (2013.01)

(58) Field of Classification Search
USPC ................................. 439/157, 153, 310, 314
See application file for complete search history.

(56) References Cited

U.S. PATENT DOCUMENTS

| | | | | |
|---|---|---|---|---|
| 5,443,393 A * | 8/1995 | Okumura | ......... | H01R 13/62938 439/157 |
| 5,593,309 A * | 1/1997 | Post | ................ | H01R 13/62905 439/157 |
| 6,325,648 B1 * | 12/2001 | Bilezikjian | ...... | H01R 13/62938 439/157 |
| 6,558,176 B1 * | 5/2003 | Martin | ............. | H01R 13/62944 439/157 |
| 6,619,970 B2 * | 9/2003 | Fukushima | ............ | H01H 9/085 439/157 |

(Continued)

FOREIGN PATENT DOCUMENTS

JP    2002-343169 A    11/2002
JP    2011-124225 A    6/2011

(Continued)

OTHER PUBLICATIONS

European Office Action dated Oct. 16, 2015 in European Application No. 14 181 393.1.

(Continued)

*Primary Examiner* — Alexander Gilman
(74) *Attorney, Agent, or Firm* — Collard & Roe, P.C.

(57) ABSTRACT

A connector device comprises a connector and a mating connector. The connector is mateable with the mating connector and removable from the mating connector. The mating connector includes a mating primary terminal and a mating secondary terminal. The connector includes a housing, a sub-connector, a first operation member and a second operation member. The housing holds a primary terminal while the sub-connector holds a secondary terminal. When the first operation member is operated, the housing is moved, and the primary terminal is connected to the mating primary terminal. When the second operation member is operated, the sub-connector is moved, and the secondary terminal is connected to the mating secondary terminal.

13 Claims, 16 Drawing Sheets

(56) References Cited

U.S. PATENT DOCUMENTS

| | | | | |
|---|---|---|---|---|
| 6,899,554 B1* | 5/2005 | Osada | ............. | H01R 13/62938 439/157 |
| 7,438,570 B2* | 10/2008 | Mori | ............... | H01R 13/62933 439/157 |
| 7,872,206 B2* | 1/2011 | Matsunaga | ............... | B60L 3/00 200/335 |
| 9,048,045 B2* | 6/2015 | Henmi | ............. | H01R 13/62933 |
| 9,122,299 B2* | 9/2015 | Martin | ..................... | G05G 1/04 |
| 2002/0173185 A1* | 11/2002 | Fukushima | .......... | H01R 13/641 439/157 |
| 2005/0098419 A1* | 5/2005 | Matsui | ............. | H01R 13/62933 200/311 |
| 2011/0117761 A1* | 5/2011 | Loncar | ................. | H01R 13/516 437/157 |

FOREIGN PATENT DOCUMENTS

| | | |
|---|---|---|
| JP | 2013-016426 A | 1/2013 |
| WO | 2013/092174 A1 | 6/2013 |

OTHER PUBLICATIONS

European Search Report in European Application No. 14181393.1, dated Dec. 8, 2014, along with an English translation of the relevant parts.

* cited by examiner

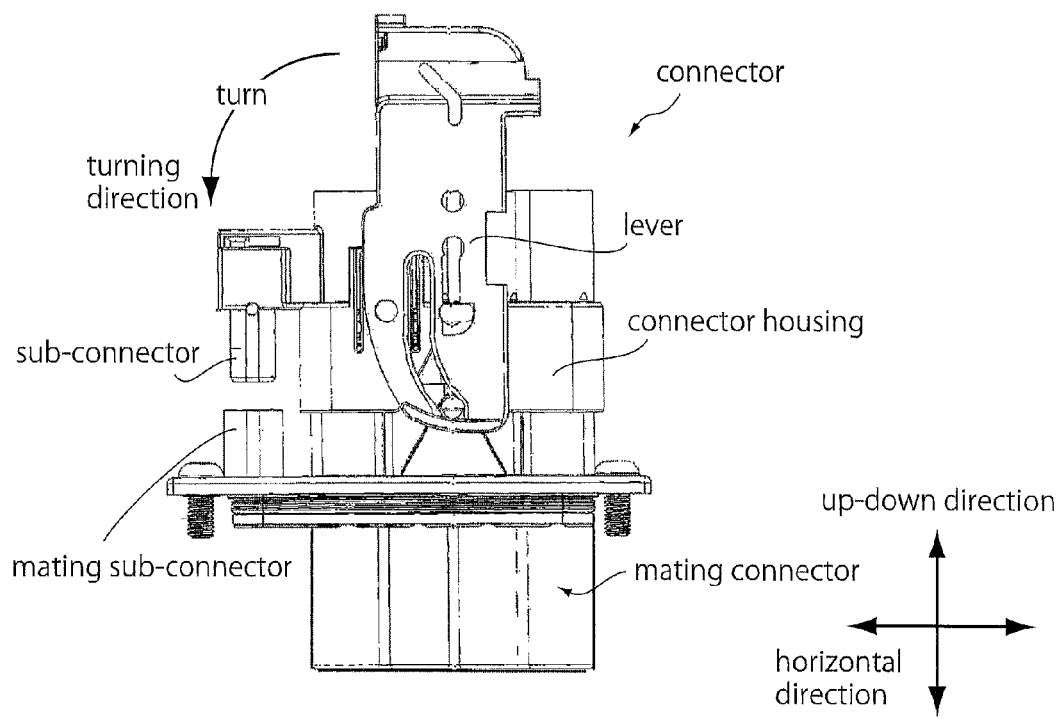
FIG. 29A
PRIOR ART
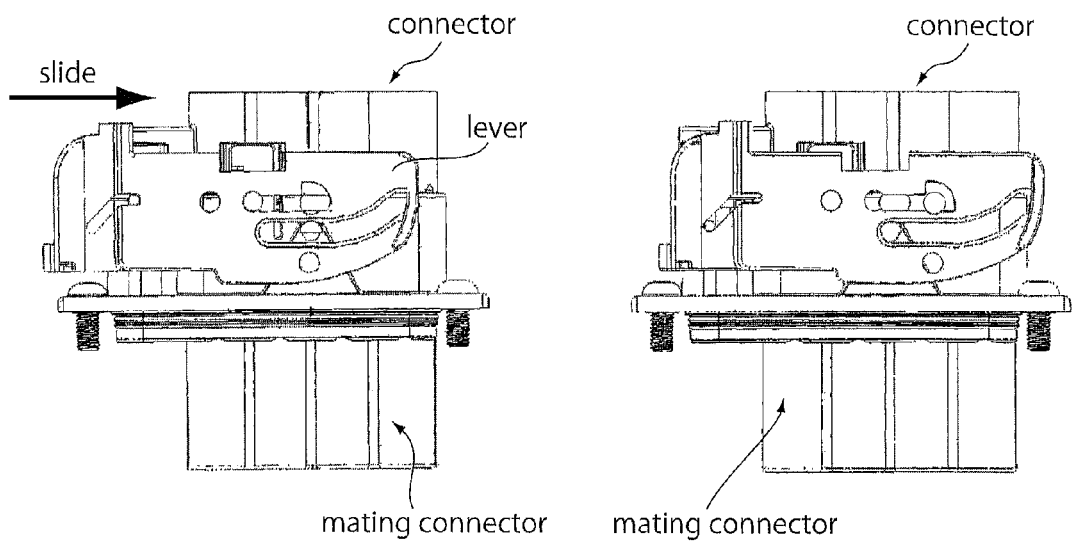
FIG. 29B
PRIOR ART
FIG. 29C
PRIOR ART

CONNECTOR DEVICE

CROSS REFERENCE TO RELATED APPLICATIONS

An applicant claims priority under 35 U.S.C. §119 of Japanese Patent Application No. JP2013-182315 filed Sep. 3, 2013.

BACKGROUND OF THE INVENTION

This invention relates to a connector device, in particular, to a connector device attached to an electric car or a hybrid car to transmit electric power supplied from a power source system.

In some cases, this type of connector device is used to transmit large electric current of about 100 A. Accordingly, it is necessary to provide a mechanism in consideration of safety of an operator. For example, this type of connector device is disclosed in JP-A 2002-343169 (Patent Document 1), the content of which is incorporated herein by reference.

As shown in FIG. 29A, the connector device disclosed in Patent Document 1 comprises a connector and a mating connector. The mating connector includes a mating sub-connector. The mating connector holds a mating primary terminal (not shown) while the mating sub-connector holds a mating secondary terminal (not shown). The connector includes a connector housing (housing), a sub-connector and a lever. The connector housing holds a primary terminal (not shown) while the sub-connector holds a secondary terminal (not shown). The lever is supported by the connector housing to be operatable, for example, turnable, while the sub-connector is supported by the connector housing to be movable in an up-down direction.

As shown in FIGS. 29A and 29B, when the lever is turned in a turning direction, the connector housing is moved downward so that the primary terminal (not shown) of the connector is connected to the primary terminal (not shown) of the mating connector. As a result, a power circuit (not shown) is formed. As shown in FIGS. 29B and 29C, when the thus-turned lever is slid in a connection direction in parallel to the horizontal direction, the sub-connector is moved downward so that the secondary terminal (not shown) of the connector is connected to the secondary terminal (not shown) of the mating connector. As a result, current flow is started. In a case where the current flow needs to be stopped, for example, in a case where the connector needs to be removed from the mating connector, the aforementioned operations are performed in reverse sequence. Specifically, first, when the lever is slid in a direction opposite to the connection direction, the secondary terminal of the connector is disconnected from the secondary terminal of the mating connector so that the current flow is stopped. Subsequently, when the lever is turned in a reverse turning direction, the primary terminal of the connector is disconnected from the primary terminal of the mating connector so that the power circuit is cut off.

In general, it takes time from the disconnection of the secondary terminal until the stop of the current flow. Moreover, it also takes time from the stop of the current flow until completion of discharge of current in the power circuit. Accordingly, in order to improve safety in operation, it is necessary to take sufficient time between the disconnection of the secondary terminal and the disconnection of the primary terminal. In other words, it is necessary to provide sufficient time between the operation of the housing that holds the primary terminal and the operation of the sub-connector that holds the secondary terminal.

As for the connector of Patent Document 1, the housing and the sub-connector can be operated by only operating the lever. Specifically, the connector can be mated by sliding the lever immediately after the lever is turned. Moreover, the connector can be removed by turning the lever immediately after the lever is slid. Accordingly, the operator might be electrically shocked when removing the connector from the mating connector.

SUMMARY OF THE INVENTION

It is therefore an object of the present invention to provide a connector device which allows to provide sufficient time between an operation of a housing that holds a primary terminal and another operation of a sub-connector that holds a secondary terminal.

One aspect of the present invention provides a connector device comprising a connector and a mating connector. The connector is mateable with the mating connector and removable from the mating connector. The mating connector includes a mating housing, a mating primary terminal and a mating secondary terminal. The mating primary terminal and the mating secondary terminal are held by the mating housing. The connector includes a housing, a primary terminal, a sub-connector, a first operation member and a second operation member. The primary terminal is held by the housing. The sub-connector includes a secondary terminal. The sub-connector is supported by the housing to be locatable at each of a first position and a second position. The first operation member is supported by the housing to be locatable at each of a first initial position and a first displaced position. The second operation member is supported by the first operation member to be locatable at each of a second initial position and a second displaced position. When a first mating operation is performed, the housing is moved to a mating position, and the primary terminal is connected to the mating primary terminal, wherein the first mating operation is an operation of moving the first operation member from the first initial position to the first displaced position. When a second mating operation is performed subsequent to the first mating operation, the sub-connector is moved to the second position from the first position, and the secondary terminal is connected to the mating secondary terminal, wherein the second mating operation is an operation of moving the second operation member from the second initial position to the second displaced position.

According to the present invention, when the connector is to be mated with the mating connector, the primary terminal of the housing is connected to the mating primary terminal by operating the first operation member while the secondary terminal of the sub-connector is connected to the mating secondary terminal by operating the second operation member. In other words, the first operation member that operates the housing is other than the second operation member that operates the sub-connector. Accordingly, it is possible to provide sufficient time between the operation of the housing and the operation of the sub-connector.

An appreciation of the objectives of the present invention and a more complete understanding of its structure may be had by studying the following description of the preferred embodiment and by referring to the accompanying drawings.

BRIEF DESCRIPTION OF THE DRAWINGS

FIG. 29A is a side view showing a connector device of Patent Document 1.

FIG. 29B is another side view showing the connector device of Patent Document 1.

FIG. 29C is still another side view showing the connector device of Patent Document 1.

Figure 1:
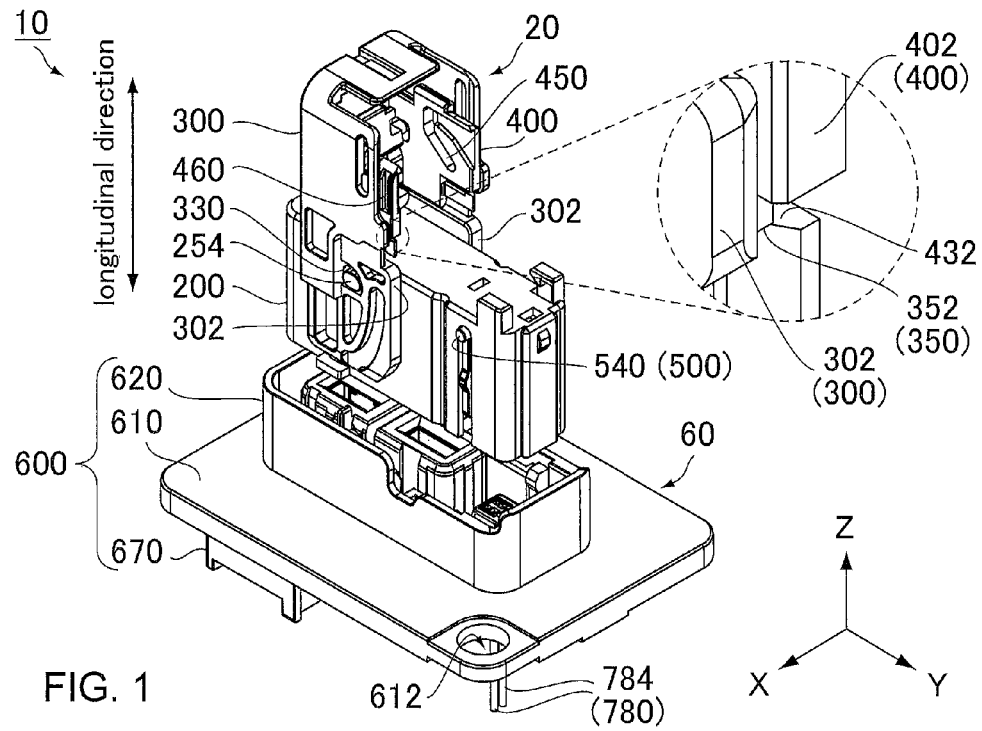
FIG. 1 is a perspective view showing a connector device according to an embodiment of the present invention, wherein a housing of a connector of the connector device is located at a separated position, and the vicinity of a second regulated portion of a second operation member of the connector (the part enclosed by dashed line) is enlarged to be illustrated.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF PREFERRED EMBODIMENTS

As can be seen from FIG. 1, a connector device 10 according to an embodiment of the present invention is attached to an object (not shown) such as an electric car to transmit electric power supplied from a power source system (not shown), for example, to a motor (not shown). However, the present invention is also applicable to a connector device other than the connector device 10 which transmittable the electric power.

Figure 9:
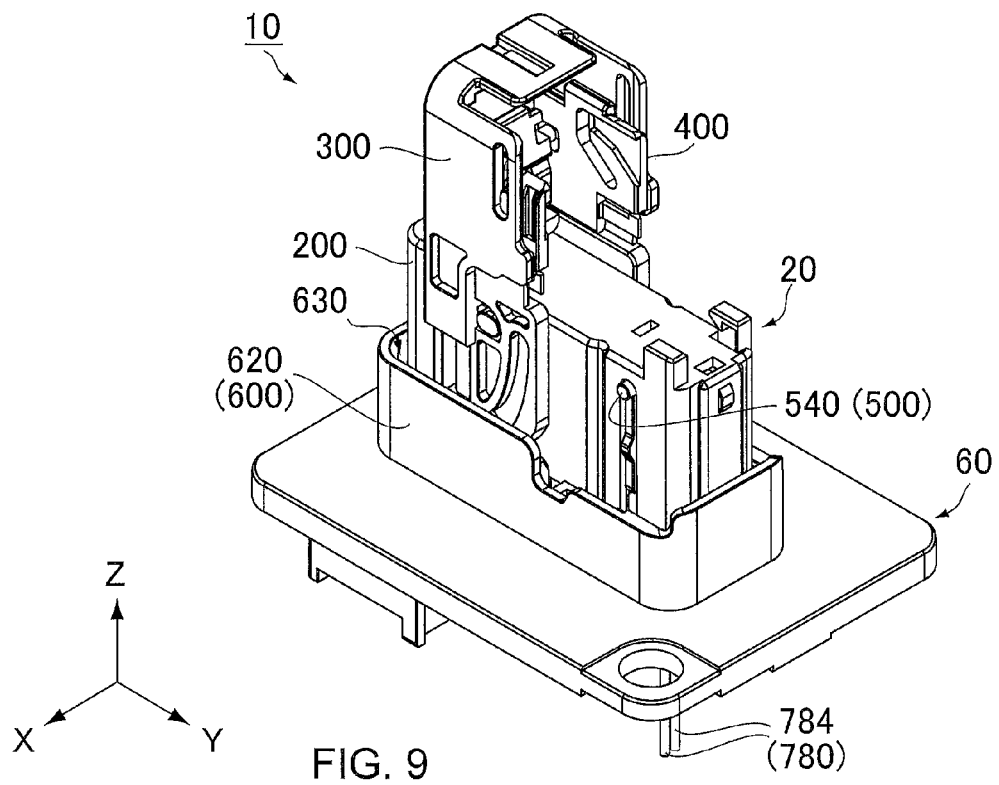
FIG. 9 is a perspective view showing the connector device of FIG. 1, wherein the housing of the connector is located at a mating start position.

As shown in FIGS. 1 and 9, the connector device 10 according to the present embodiment comprises a connector 20 and the mating connector 60. The connector 20 is mateable with the mating connector 60 along a mating direction (negative Z-direction) and removable from the mating connector 60 along a removing direction (positive Z-direction).

As shown in FIGS. 2 to 5, the mating connector 60 according to the present embodiment includes a mating housing 600 made of an insulator, two mating primary terminals 680 each made of a conductor, a mating sub-connector 700 made of an insulator, two mating secondary terminals 780 each made of a conductor and two nuts 800 (see FIG. 5) each made of a metal.

The mating housing 600 has a plate 610, an upper body 620 and a lower body 670. The plate 610 has a plate-like shape in parallel to the XY-plane. The plate 610 is formed with a hole 612. The hole 612 is used when the mating housing 600 is attached to the object (not shown). The upper body 620 projects upward (in the positive Z-direction) from the plate 610 in an up-down direction (Z-direction) while the lower body 670 projects downward (in the negative Z-direction) from the plate 610. When the mating housing 600 is attached to the object, the lower body 670 is inserted into the object.

The upper body 620 has a rectangular cylindrical shape which is long in a front-rear direction (Y-direction) and short in a width direction (X-direction). In detail, the upper body 620 has a front wall 622, a rear wall 624, two sidewalls 626 and an accommodation portion (accommodation space) 630. The front wall 622 is located at a front end (positive Y-side end) of the upper body 620 in the Y-direction, and the rear wall 624 is located at a rear end (negative Y-side end) of the upper body 620 in the Y-direction. The sidewalls 626 are located at opposite sides of the upper body 620 in the X-direction, respectively. The accommodation portion 630 is a space enclosed by the front wall 622, the rear wall 624 and the sidewalls 626 in the XY-plane.

Figure 2:
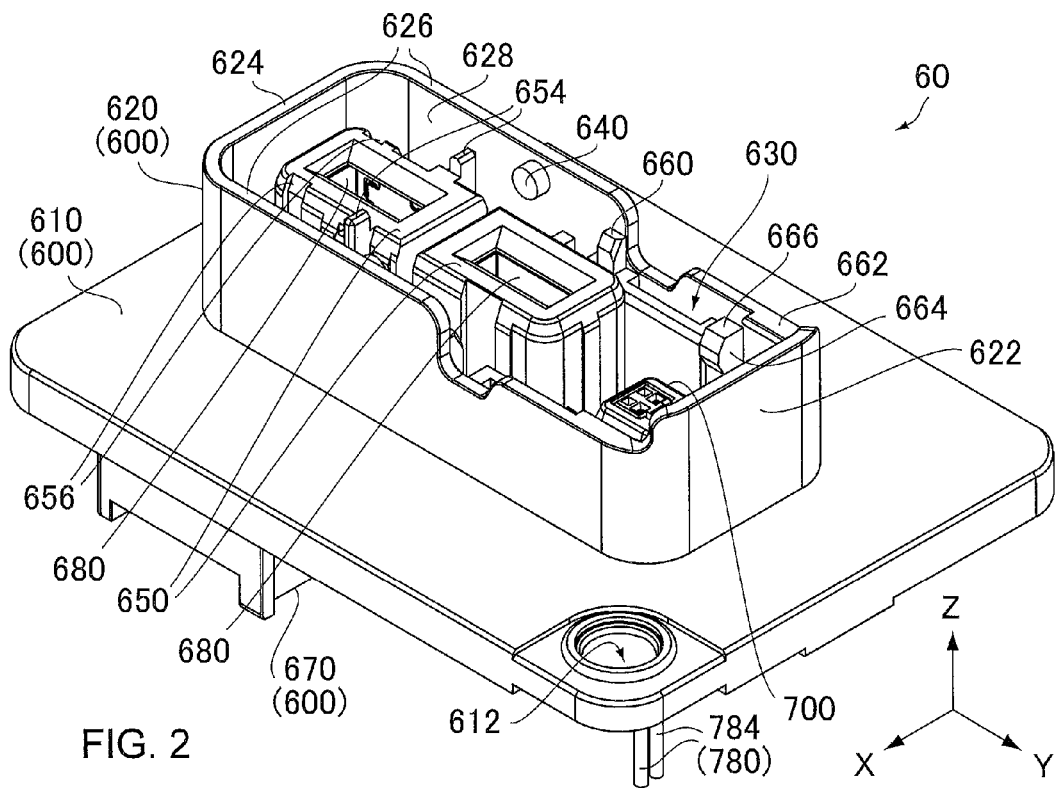
FIG. 2 is a perspective view showing a mating connector of the connector device of FIG. 1.
Figure 5:
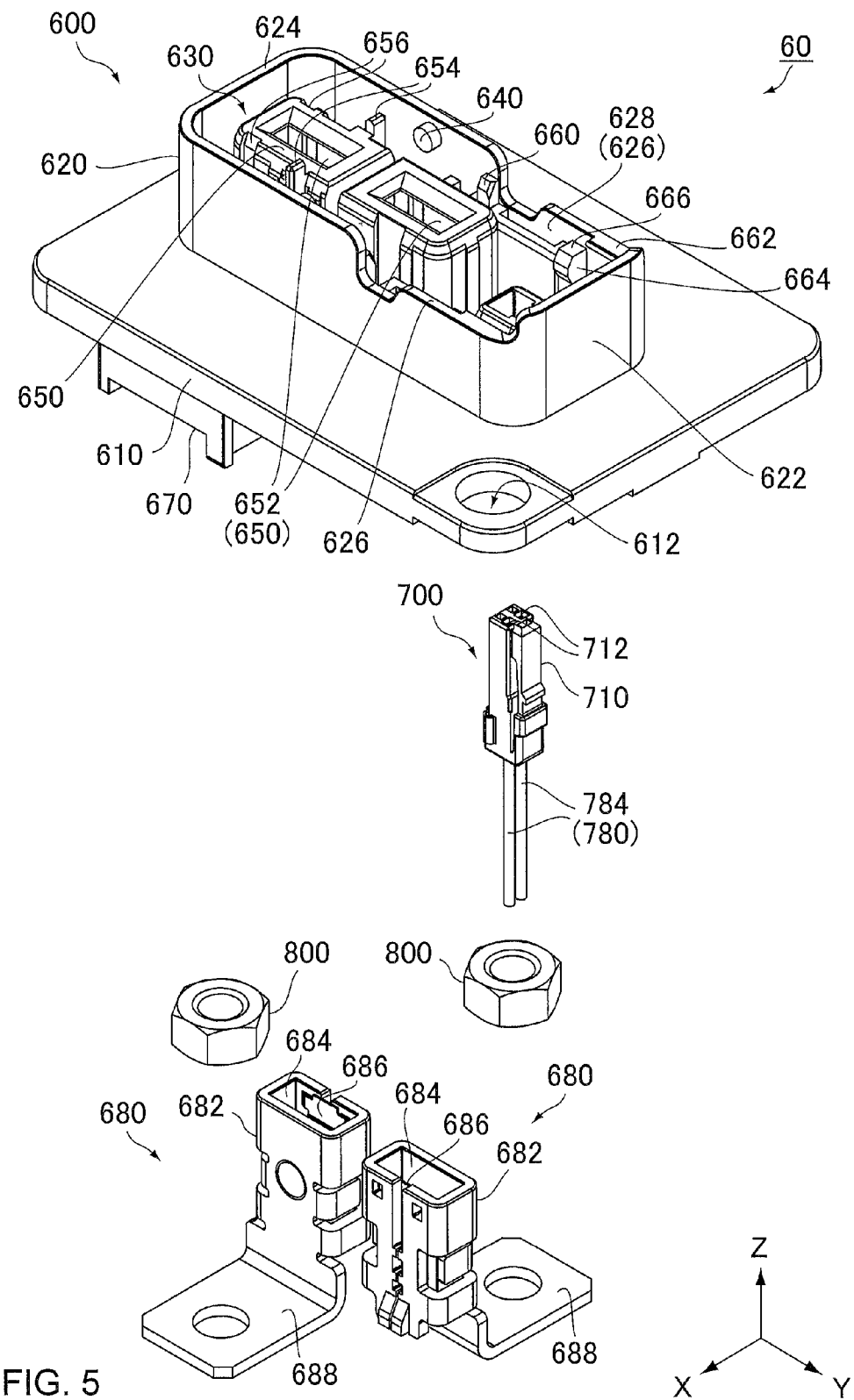
FIG. 5 is an exploded, perspective view showing the mating connector of FIG. 2.

As shown in FIGS. 2 and 5, each of the sidewalls 626 has an inner surface 628 which faces the accommodation portion 630. The inner surface 628 extends in parallel to the YZ-plane. Each of the sidewalls 626 is provided with a mating operated portion (first cam protrusion) 640, a mating second releaser 660, a maintaining portion 662 and a protrusion 664. Each of the mating operated portion 640, the mating second releaser 660, the maintaining portion 662 and the protrusion 664 protrudes into the accommodation portion 630 from the inner surface 628.

The mating operated portion 640 has a cylindrical shape extending in the X-direction. The mating second releaser 660 extends long on the inner surface 628 along the Z-direction (see FIG. 15). In detail, the mating second releaser 660 has an upper surface (positive Z-side surface), a slope and a vertical surface (see FIG. 2), wherein the upper surface is in parallel to the XY-plane, the slope extends inward in the X-direction from the upper surface while sloping downward (in the negative Z-direction), and the vertical surface extends downward from the slope. The maintaining portion 662 is provided in the vicinity of a front end of the sidewall 626. The maintaining portion 662 extends long in the Y-direction along an upper end (positive Z-side end) of the sidewall 626. The protrusion 664 is provided with a push-back portion 666. In detail, the protrusion 664 has an upper surface in parallel to the XY-plane. The push-back portion 666 according to the present embodiment is the upper surface of the protrusion 664.

The accommodation portion 630 opens upward. The accommodation portion 630 is provided with two holders 650 therewithin. The two holders 650 are arranged in the Y-direction. Each of the holders 650 is formed with a holding hole 652 (see FIGS. 5 and 14). The holding hole 652 pierces the mating housing 600 in the Z-direction (see FIG. 14).

Each of the holders 650 has two sidewalls. The sidewalls of the holder 650 are located at opposite sides of the holder 650 in the X-direction, respectively. The rearward one (the negative Y-side one) of the two holders 650 has two mating first releasers 654 and two keys 656. The mating first releaser 654 and the key 656 are provided on each sidewall of the holder 650. The mating first releaser 654 protrudes toward the inner surface 628 from the sidewall of the holder 650 while extending upward. The key 656 is a recess formed on the sidewall of the holder 650. The key 656 is recessed inward in the X-direction while extending in the Z-direction.

As shown in FIG. 5, the mating sub-connector 700 according to the present embodiment includes a body portion 710. The body portion 710 is provided with two receivers 712 each opening upward. The receivers 712 are arranged in the X-direction. In detail, one of the receivers 712 is located at the positive X-side of the body portion 710 while a remaining one of the receivers 712 is located at the negative X-side of the body portion 710.

Figure 14:
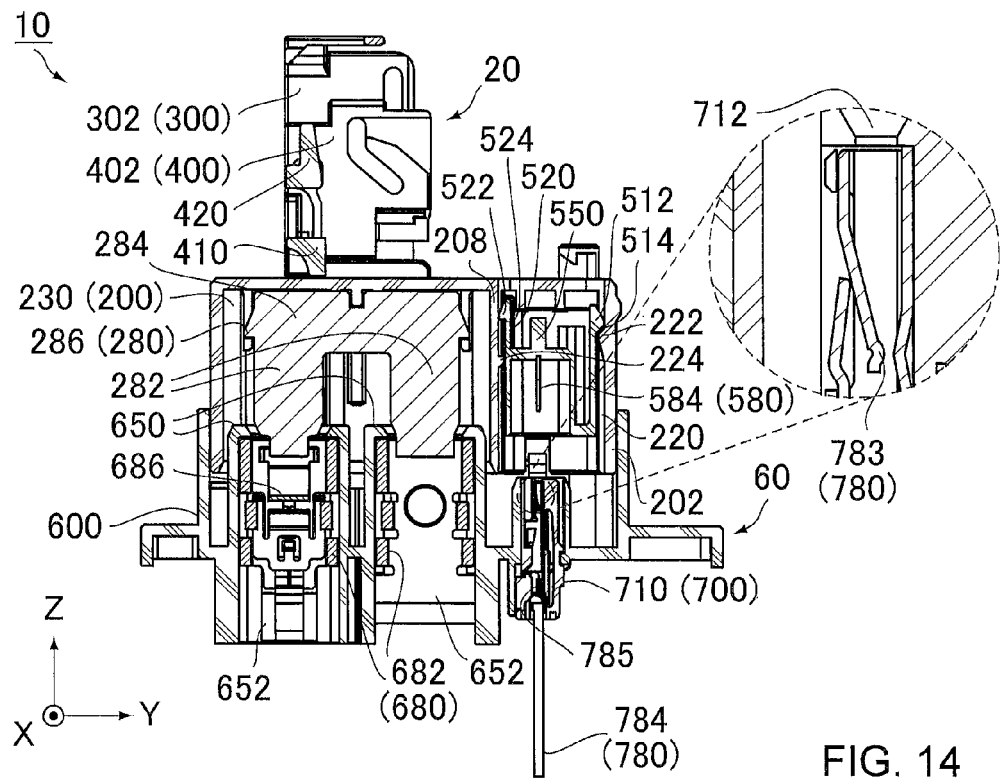
FIG. 14 is a cross-sectional view showing the connector device of FIG. 13, taken along line XIV-XIV, wherein the vicinity of a contact portion of a mating secondary terminal (the part enclosed by dashed line) is enlarged to be illustrated, and a cable is illustrated without showing details and material in its cross-section.

As shown in FIGS. 5 and 14, each of the mating secondary terminals 780 has a contact portion 783 and a terminal portion 785. The terminal portion 785 is connected to a cable 784 by crimping, soldering or the like. Each of the mating secondary terminals 780 is held by the mating sub-connector 700. In detail, the mating secondary terminals 780 are held by the receivers 712 of the body portion 710, respectively, so as not to be brought into contact with each other. Accordingly, The two mating secondary terminals 780 are not electrically connected with each other.

Figure 3:
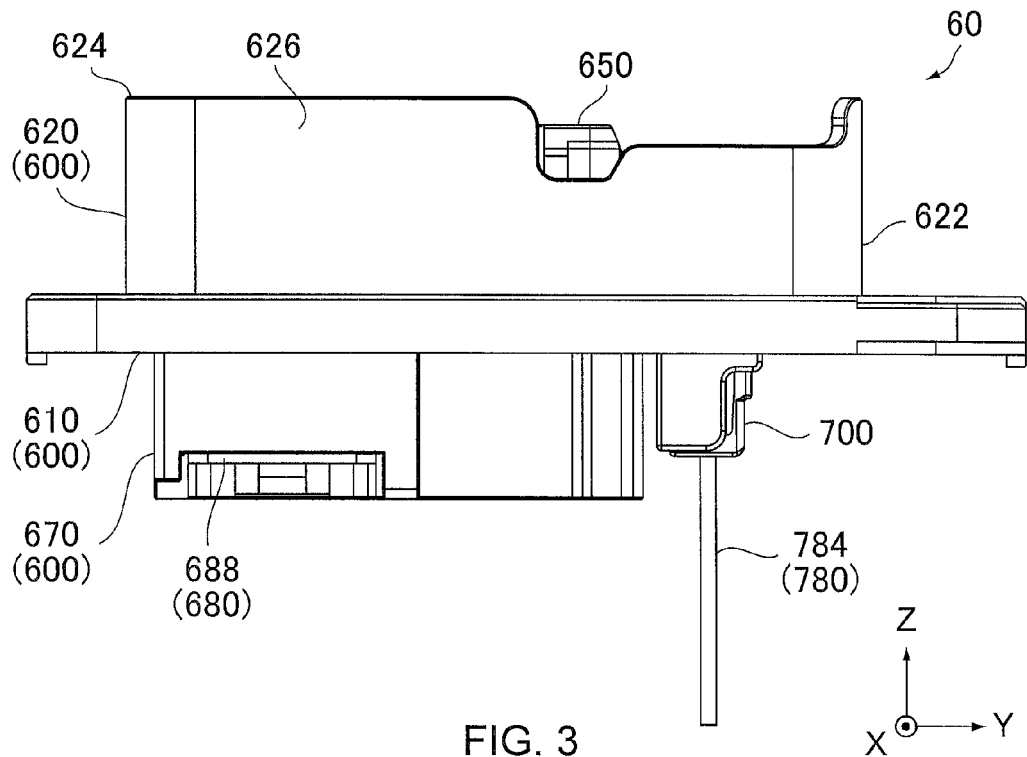
FIG. 3 is a side view showing the mating connector of FIG. 2.
Figure 4:
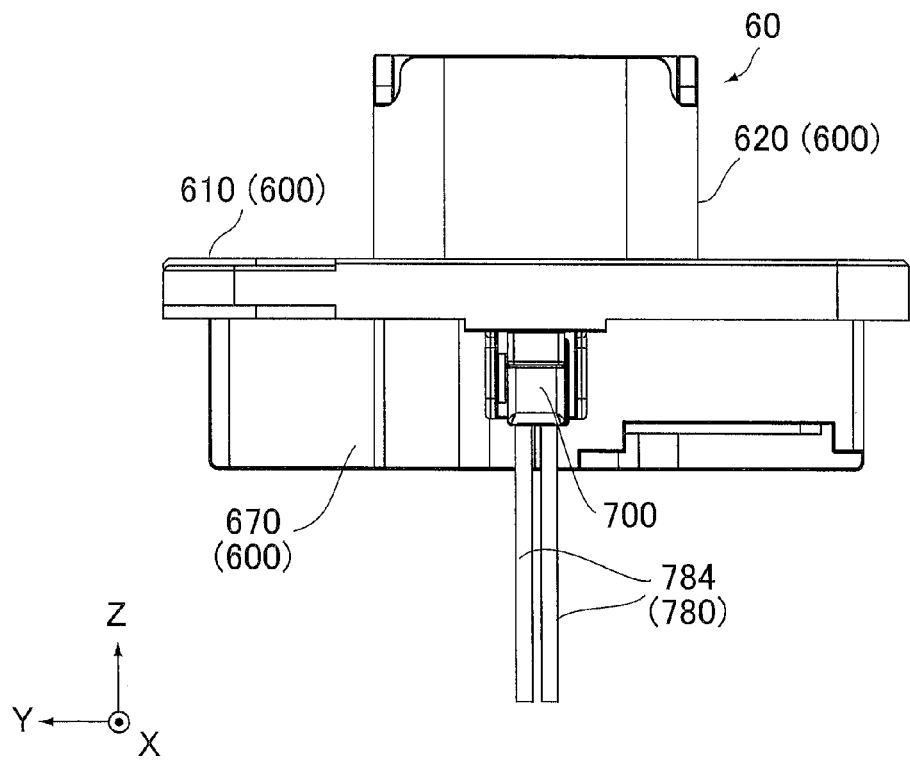
FIG. 4 is a front view showing the mating connector of FIG. 2.

As shown in FIGS. 2 to 4, the mating sub-connector 700, which holds the mating secondary terminals 780, is held by the mating housing 600. The cables 784, which are connected to the terminal portions 785 of the mating secondary terminals 780, extend downward beyond the lower body 670 of the mating housing 600. When the mating housing 600 is attached to the object (not shown), the cables 784 are electrically connected with a switch (not shown) of a power circuit (not shown). However, since the two mating secondary terminals 780 are not electrically connected with each other, the switch is opened.

As shown in FIG. 5, each of the mating primary terminals 680 according to the present embodiment has a body portion 682, a receiver 684, a contact piece 686 and a terminal portion 688. The body portion 682 has a rectangular tube-like shape extending in the Z-direction. The receiver 684 is a space surrounded by the body portion 682. The contact piece 686 is held in the receiver 684. The terminal portion 688 extends outward in the X-direction from a lower end (the negative Z-side end) of the body portion 682.

Figure 11:
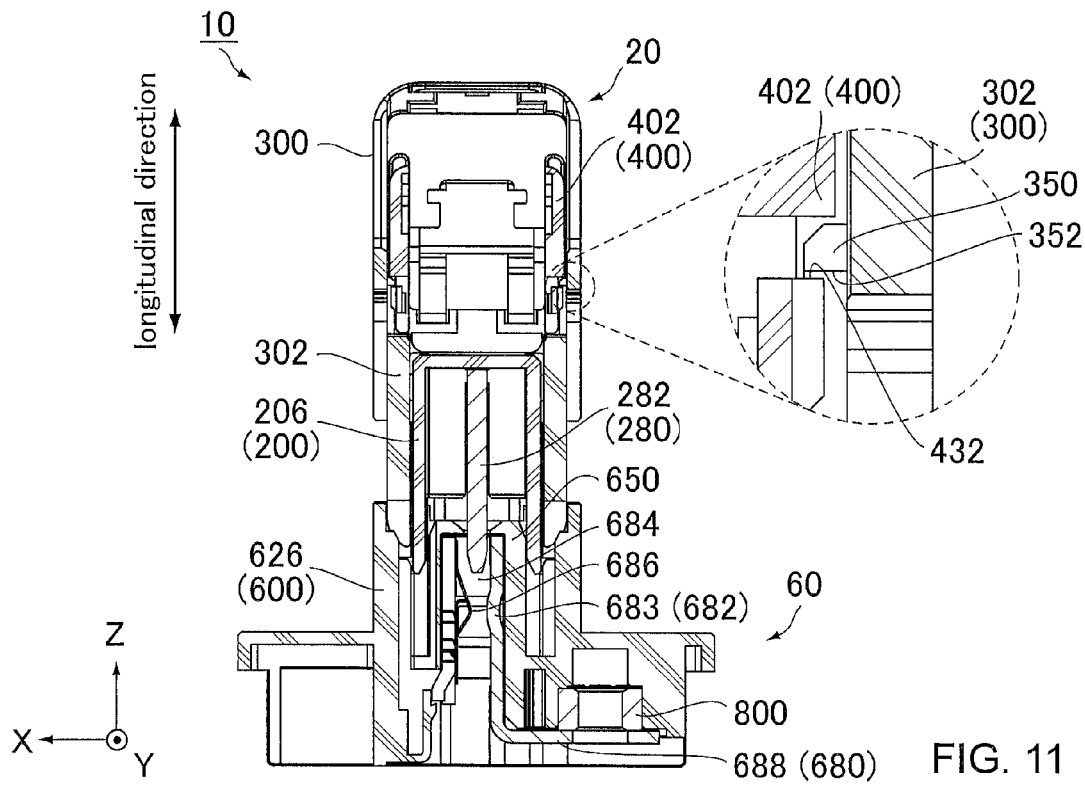
FIG. 11 is a cross-sectional view showing the connector device of FIG. 10, taken along line XI-XI, wherein the vicinity of the second regulated portion of the second operation member (the part enclosed by dashed line) is enlarged to be illustrated.
Figure 12:
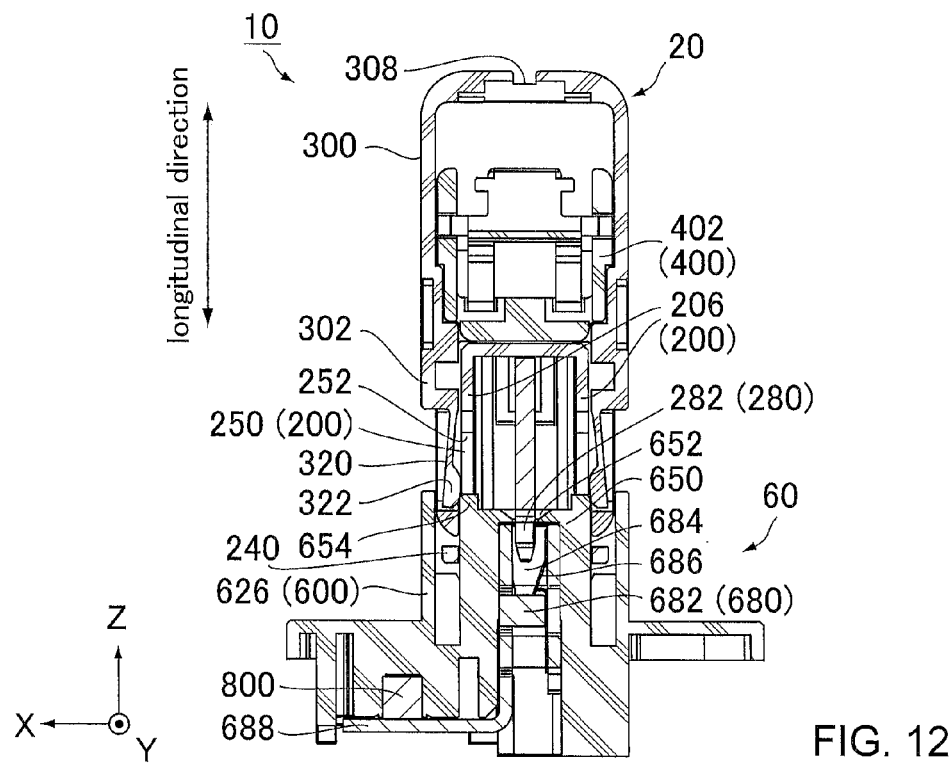
FIG. 12 is a cross-sectional view showing the connector device of FIG. 10, taken along line XII-XII.

As shown in FIGS. 11 and 12, the mating primary terminals 680 are inserted into the holding holes 652 (see FIG. 5) of the holders 650 of the mating housing 600 from below to be held thereby, respectively. On the terminal portions 688, nuts 800 are arranged, respectively. The body portion 682 has a contact portion 683 (see FIG. 11). The contact portion 683 protrudes in the receiver 684. The contact piece 686 is provided to face the contact portion 683. A part of the contact piece 686 protrudes toward the contact portion 683 in the receiver 684. When the mating housing 600 is attached to the object (not shown), the terminal portions 688 are electrically connected with the power circuit (not shown). However, the terminal portions 688 of the two mating primary terminals 680 are not electrically connected with each other. Accordingly the power circuit is cut off.

Figure 6:
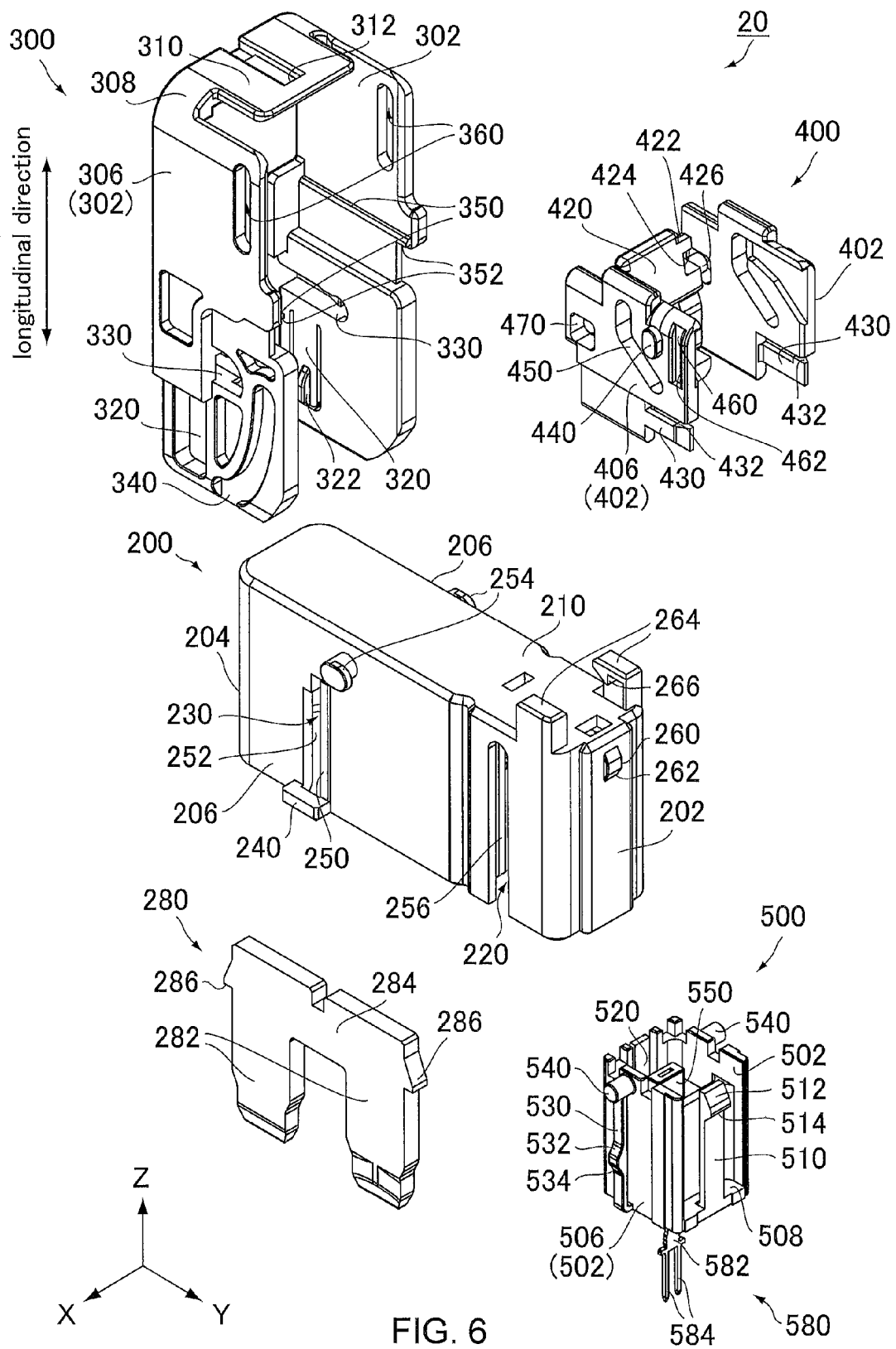
FIG. 6 is an exploded, perspective view showing the connector of the connector device of FIG. 1.

As shown in FIGS. 1 and 6, the connector 20 according to the present embodiment includes a housing 200 made of an insulator, a primary terminal (power terminal) 280 (see FIG. 6) made of a conductor, a first operation member (lever) 300 made of an insulator, a second operation member (slider) 400 made of an insulator, a sub-connector 500 made of an insulator and a secondary terminal (detection terminal) 580 (see FIG. 6) made of a conductor.

As shown in FIG. 6, when seen obliquely from above, the housing 200 according to the present embodiment has a rectangular parallelepiped shape which is long in the Y-direction and short in the X-direction. In detail, the housing 200 has a front wall 202, a rear wall 204, two sidewalls 206 and a cover 210. The front wall 202 is located at a front end of the housing 200 in the Y-direction while the rear wall 204 is located at a rear end of the housing 200 in the Y-direction. The sidewalls 206 are located at opposite sides of the housing 200 in the X-direction, respectively. The cover 210 is located at an upper end of the housing 200 in the Z-direction.

As shown in FIG. 14, the housing 200 is formed of a partition wall 208, an accommodation portion (accommodation space) 220 and an accommodation portion (accommodation space) 230 therewithin. Each of the accommodation portion 220 and the accommodation portion 230 is a part of a space that is surrounded by the front wall 202, the rear wall 204, the sidewalls 206 and the cover 210 (see FIG. 6). The accommodation portion 220 is located at a front side (the positive Y-side) of the housing 200 while the accommodation portion 230 is located at a rear side (the negative Y-side) of the housing 200. The partition wall 208 extends in parallel to the XZ-plane. The partition wall 208 separates the accommodation portion 220 and the accommodation portion 230 from each other.

The accommodation portion 220 is provided with a protrusion 222 and a protrusion 224 therewithin. The protrusion 222 is provided on an inner surface of the front wall 202 to protrude rearward (in the negative Y-direction) in the accommodation portion 220. In detail, the protrusion 222 has an upper surface and a lower surface (the negative Z-side surface), wherein the upper surface extends rearward from the inner surface of the front wall 202 while sloping downward, and the lower surface extends to the inner surface of the front wall 202 while sloping downward. The protrusion 224 is provided on a front surface (the positive Y-side surface) of the partition wall 208 to protrude forward (in the positive Y-direction) in the accommodation portion 220. In detail, the protrusion 224 has an upper surface and a lower surface, wherein the upper surface extends forward from the front surface of the partition wall 208 in parallel to the XY-plane, and the lower surface extends forward from the front surface of the partition wall 208 while sloping upward.

Figure 13:
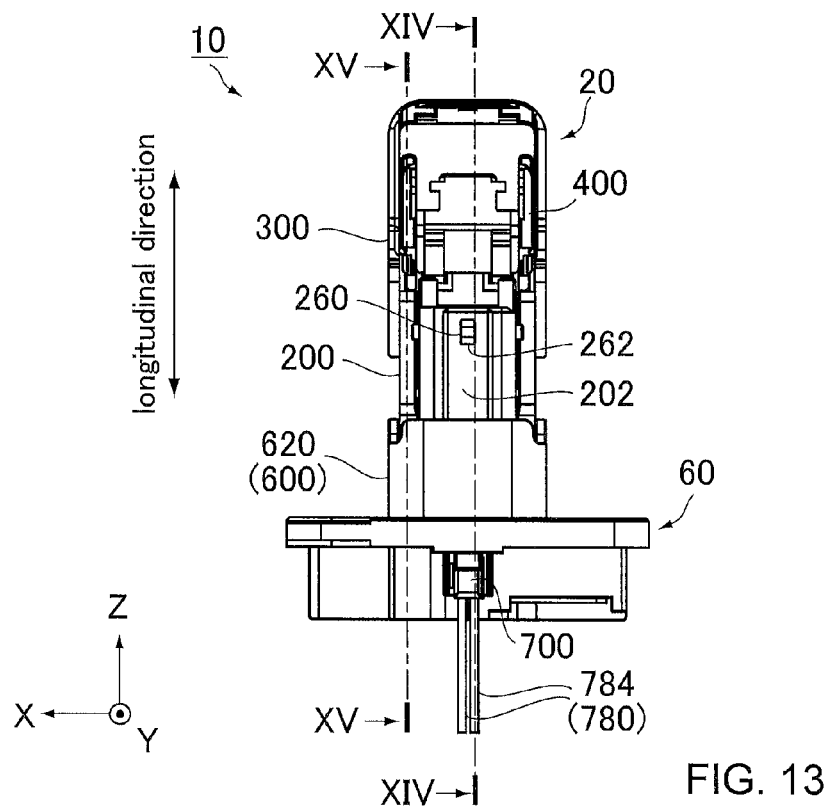
FIG. 13 is a front view showing the connector device of FIG. 9.

As shown in FIGS. 6 and 13, the housing 200 has a first lock portion 262. In detail, the front wall 202 is provided with a protrusion 260. The protrusion 260 protrudes forward from an upper part (the positive Z-side part) of the front wall 202. The protrusion 260 has an upper surface and a lower surface, wherein the upper surface extends forward from the front wall 202 while sloping downward, and the lower surface extends forward from the front wall 202 while sloping upward. The first lock portion 262 according to the present embodiment is the lower surface of the protrusion 260.

As shown in FIG. 6, each of the sidewalls 206 is provided with a protruding portion 240, a ditch 250, a support shaft 254 and a guide ditch 256. The protruding portion 240 protrudes outward in the X-direction from a lower end of the sidewall 206. The ditch 250 is a ditch extending in the Z-direction while piercing the sidewall 206 in the X-direction. The ditch 250 opens downward from the sidewall 206 and the protruding portion 240 (see FIG. 12). The support shaft 254 is formed in the vicinity of the upper end of the sidewall 206. The support shaft 254 has a cylindrical portion and an oval portion. The cylindrical portion cylindrically projects outward in the X-direction from the sidewall 206. The oval portion is provided at an end of the cylindrical portion. The oval portion has an oval shape that is short in the Z-direction and long in the Y-direction. The guide ditch 256 is a ditch extending in the Z-direction while piercing the sidewall 206 in the X-direction. The guide ditch 256 opens downward from the sidewall 206.

As shown in FIGS. 6 and 12, the housing 200 has two first regulation portions 252. The first regulation portion 252 according to the present embodiment is a rear wall surface of the ditch 250.

As shown in FIG. 6, the housing 200 has two second lock portions 266. In detail, the cover 210 is provided with two protrusions 264. The protrusions 264 are provided at opposite sides of the cover 210 in the X-direction, respectively. The protrusions 264 protrude upward from the vicinity of a front end of the cover 210. Each of the protrusions 264 has an upper surface, a slope and a vertical surface, wherein the upper surface is in parallel to the XY-plane, the slope extends forward from the upper surface while sloping downward, and the vertical surface extends upward from the slope. The second lock portion 266 according to the present embodiment is the vertical surface of the protrusion 264.

As shown in FIGS. 6 and 14, the primary terminal 280 according to the present embodiment has a plate-like shape in parallel to the YZ-plane. In detail, the primary terminal 280 has two contact portions 282 and a coupling portion 284. Each of the contact portions 282 extends in the negative Z-direction from the coupling portion 284. The coupling portion 284 couples the contact portions 282 with each other in the Y-direction. The coupling portion 284 is provided with two supported portions 286. Each of the supported portions 286 protrudes outward in the Y-direction from the coupling portion 284. The primary terminal 280 is inserted into the accommodation portion 230 from below the housing 200 to be held by the housing 200 (see FIG. 14). In detail, when the primary terminal 280 is inserted in the accommodation portion 230, the supported portions 286 are maintained at predetermined positions of the accommodation portion 230 so that the primary terminal 280 is held in the housing 200.

Figure 8:
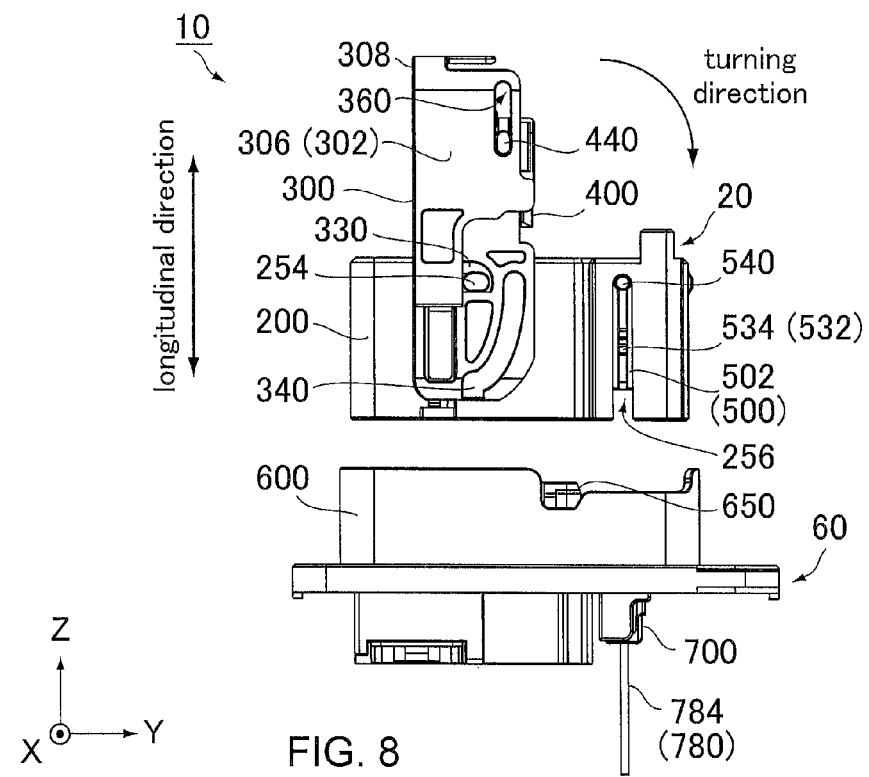
FIG. 8 is a side view showing the connector device of FIG. 1.

As shown in FIGS. 6 and 8, the first operation member 300 according to the present embodiment has two sidewalls 302 and a coupling portion (first handle portion) 308. The sidewalls 302 are located at opposite sides of the first operation member 300 in the X-direction, respectively. Each of the sidewalls 302 extends in parallel to the YZ-plane. Each of the sidewalls 302 extends long in the Z-direction under a state shown in FIGS. 6 and 8. In the following explanation, a direction along which the sidewall 302 extends long (for example, the Z-direction under the state shown in FIGS. 6 and 8) is referred to as "longitudinal direction" of the first operation member 300. Each of the sidewalls 302 has an outer surface 306. The outer surface 306 is an outer surface of the sidewall 302 in the X-direction. Each of the sidewalls 302 has a first end (the positive Z-side end in FIGS. 6 and 8) in the longitudinal direction. The coupling portion 308 couples these first ends with each other in the X-direction.

As shown in FIG. 6, each of the sidewalls 302 is provided with a spring portion 320, a fulcrum portion (shaft hole) 330, a first operating portion (first cam groove) 340, a protrusion 350 and a slide channel 360.

As can be seen from FIGS. 6 and 12, the spring portion 320 is resiliently deformable in the X-direction, especially outward in the X-direction. The spring portion 320 is provided with a first regulated portion 322 at an end thereof. The first regulated portion 322 protrudes inward in the X-direction from the spring portion 320 in an arc shape while extending long in the longitudinal direction. The first regulated portion 322 is movable in a direction intersecting the longitudinal direction, especially outward in the X-direction, by resilient deformation of the spring portion 320. In other words, the first regulated portion 322 according to the present embodiment is resiliently supported by the spring portion 320 to be movable in a first predetermined direction (outward in the X-direction).

As shown in FIGS. 6 and 8, the fulcrum portion 330 according to the present embodiment is a hole piercing the sidewall 302 in the X-direction. The fulcrum portion 330 has a sector shape at the outer surface 306 of the sidewall 302. In detail, the fulcrum portion 330 according to the present embodiment has a quarter circle shape. The quarter circle of the fulcrum portion 330 has two radius lines perpendicular to each other. One of the two radius lines extends in the longitudinal direction while the other radius line extends in a direction (the Y-direction in FIGS. 6 and 8) perpendicular to the longitudinal direction.

As shown in FIGS. 1 and 8, the first operation member 300 is attached to the housing 200 so that the two sidewalls 302 sandwich the housing 200 in the X-direction. In detail, the support shafts 254 of the housing 200 are inserted into the fulcrum portions 330 of the first operation member 300, respectively. The first operation member 300 is attached to the housing 200 so that the longitudinal direction of the first operation member 300 extends in the Z-direction. A position of the first operation member 300 under this state where the longitudinal direction extends in the Z-direction is referred to as a first initial position. The first operation member 300 at the first initial position extends vertically, or in the Z-direction.

As shown in FIG. 8, when the first operation member 300 is located at the first initial position, the oval portion of the support shaft 254 is slightly apart from an edge of the fulcrum portion 330 in the Y-direction. As can be seen from this arrangement between the support shaft 254 and the fulcrum portion 330, the first operation member 300 located at the first initial position is basically allowed to be turned only along a turning direction, or to be turned clockwise as shown in FIG. 8.

Figure 10:
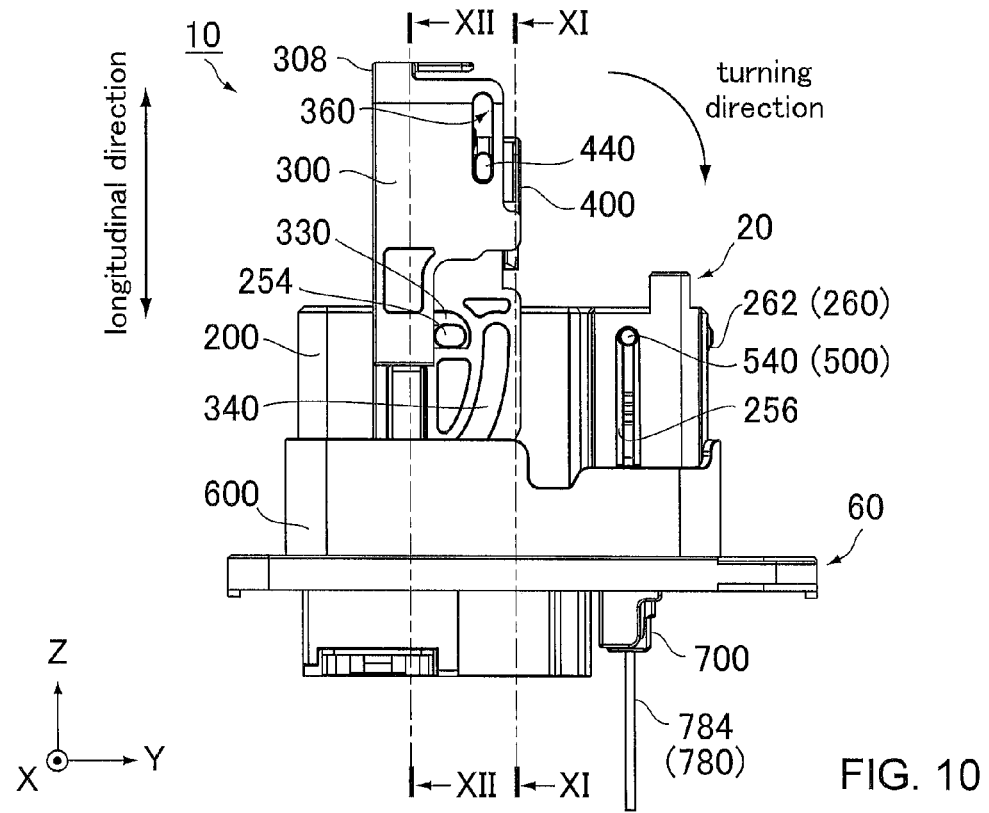
FIG. 10 is a side view showing the connector device of FIG. 9.
Figure 17:
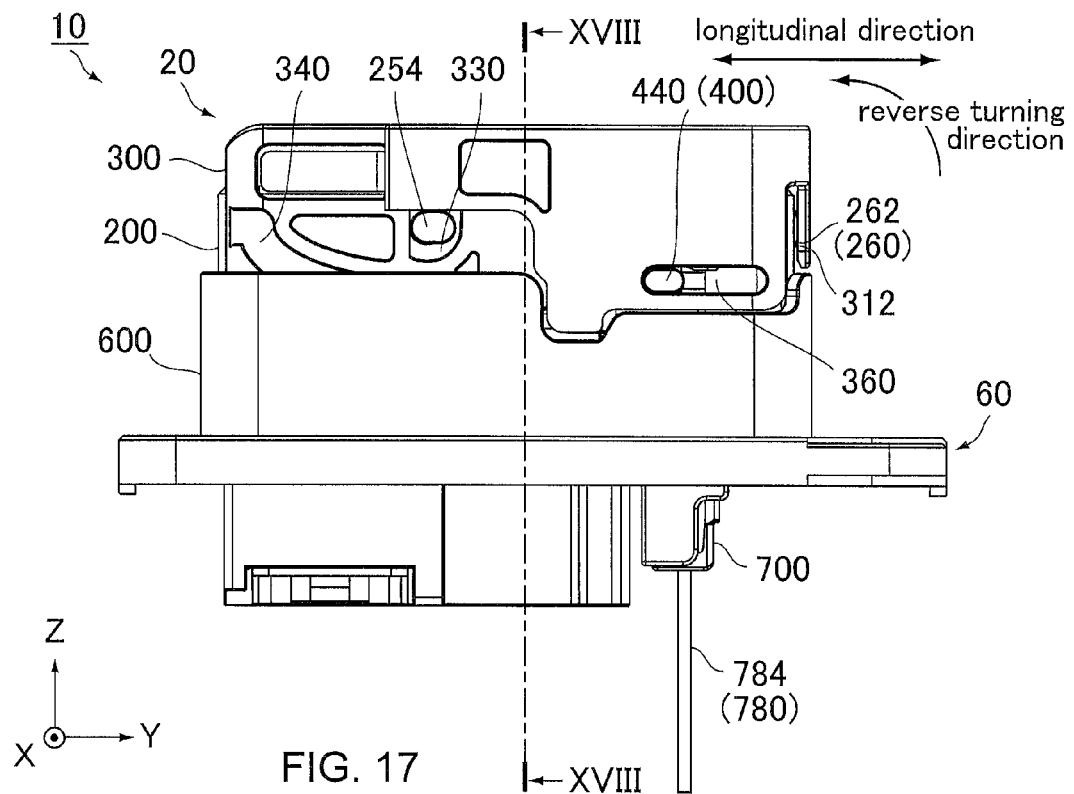
FIG. 17 is a side view showing the connector device of FIG. 16.

More specifically, as can be seen from FIGS. 10 and 17, the first operation member 300 is supported by the housing 200 to be locatable at each of the first initial position and a first displaced position (the position shown in FIG. 17). In detail, the first operation member 300 is movable in turn around the fulcrum portion 330 between the first initial position and the first displaced position.

As can be seen from FIGS. 6 and 12, when the housing 200 is located at a separated position (the position shown in FIG. 1) where the housing 200 is separated from the mating housing 600, the first operation member 300 is located at the first initial position. At that time, the first regulated portions 322 of the first operation member 300 are inserted in the ditches 250 of the housing 200, respectively. Accordingly, the turn of the first operation member 300 around the fulcrum portion 330 is prevented. In detail, according to the present embodiment, when the housing 200 is located at the separated position under a state where the first operation member 300 is located at the first initial position, the first regulation portion 252 regulates a movement of the first regulated portion 322 in a first predetermined plane (YZ-plane) perpendicular to the first predetermined direction (outward in the X-direction) to prevent the first operation member 300 from being moved to the first displaced position.

As shown in FIG. 6, the first operating portion 340 of the first operation member 300 according to the present embodiment is a recess formed in the outer surface 306 of the sidewall 302. The first operating portion 340 opens at an end (the negative Z-side end under the state shown in FIG. 6) of the sidewall 302 in the longitudinal direction. More specifically, when the first operation member 300 is located at the first initial position, the first operating portion 340 opens downward (see FIG. 8). The first operating portion 340 extends from the aforementioned opening toward the vicinity of the fulcrum portion 330 while gently curving.

As shown in FIGS. 6 and 11, the first operation member 300 has two second regulation portions 352. In detail, the protrusion 350 protrudes inward in the X-direction from the sidewall 302 while extending in a direction perpendicular to the longitudinal direction. The protrusion 350 has a surface perpendicular to the longitudinal direction (the negative Z-side surface under the state shown in FIGS. 6 and 11). The second regulation portion 352 according to the present embodiment is a part of the aforementioned surface, wherein the part of the surface is located in the vicinity of an end of the protrusion 350.

As shown in FIGS. 6 and 8, the slide channel 360 according to the present embodiment is a ditch piercing the sidewall 302 in the X-direction. The slide channel 360 extends long in the longitudinal direction.

As shown in FIG. 6, a middle part of the coupling portion 308 in the X-direction extends in a direction perpendicular to the longitudinal direction to be formed with a spring portion 310. The spring portion 310 has a middle part in the X-direction formed with a ditch that pierces the spring portion 310 in the longitudinal direction. The ditch extends to the vicinity of an end of the spring portion 310 in a direction perpendicular to the longitudinal direction. The ditch is formed with a first locked portion 312 at an end thereof. In other words, the first locked portion 312 according to the present embodiment is an edge of the aforementioned ditch. The first locked portion 312 extends along the X-direction.

Figure 7:
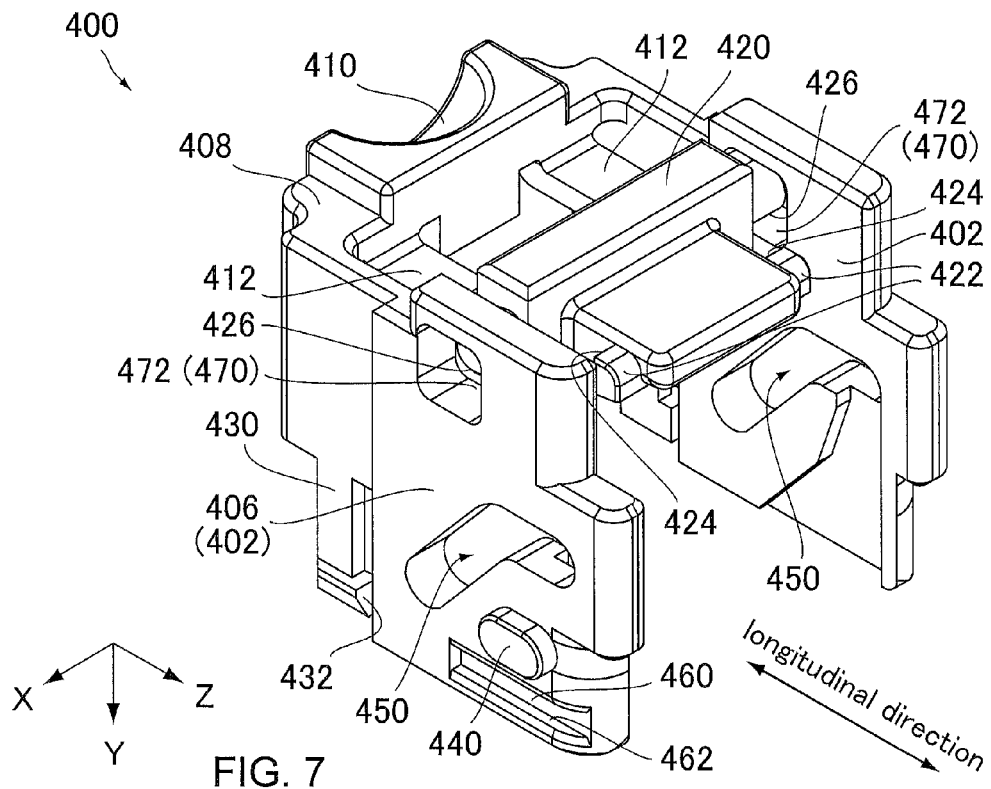
FIG. 7 is a perspective view showing a second operation member of the connector of FIG. 6.

As shown in FIGS. 6 and 7, the second operation member 400 according to the present embodiment has two sidewalls 402, a coupling portion 408 (see FIG. 7) and a lock lever 420. The sidewalls 402 are located at opposite sides of the second operation member 400 in the X-direction, respectively. Each of the sidewalls 402 extends in parallel to the YZ-plane. Each of the sidewalls 402 has an outer surface 406. The outer surface 406 is an outer surface of the sidewall 402 in the X-direction. The coupling portion 408 couples the sidewalls 402 with each other in the X-direction.

As shown in FIGS. 6 to 8, each of the sidewalls 402 is provided with a slidable protrusion 440. The slidable protrusion 440 has an oval shape in the YZ-plane. The slidable protrusions 440 are inserted in the slide channels 360 of the first operation member 300, respectively, so that each oval shape extends long in the longitudinal direction of the first operation member 300 (see FIG. 8).

As shown in FIG. 8, when the first operation member 300 is located at the first initial position, a length of the slidable protrusion 440 in the Y-direction is slightly smaller than a width (a length in the Y-direction) of the slide channel 360 while another length of the slidable protrusion 440 in the Z-direction is larger than the width of the slide channel 360. Accordingly, the slidable protrusion 440 is movable along the slide channel 360 while being hardly movable in a direction intersecting the slide channel 360. In other words, the second operation member 400 according to the present embodiment is supported by the first operation member 300 to be movable in the longitudinal direction of the first operation member 300. Moreover, the second operation member 400 is attached to the first operation member 300 so that the slidable protrusion 440 is located at an end (the negative Z-side end under the state shown in FIG. 8) of the slide channel 360. A position of the second operation member 400 under this state (the position shown in FIG. 8) is referred to as a second initial position.

Figure 23:
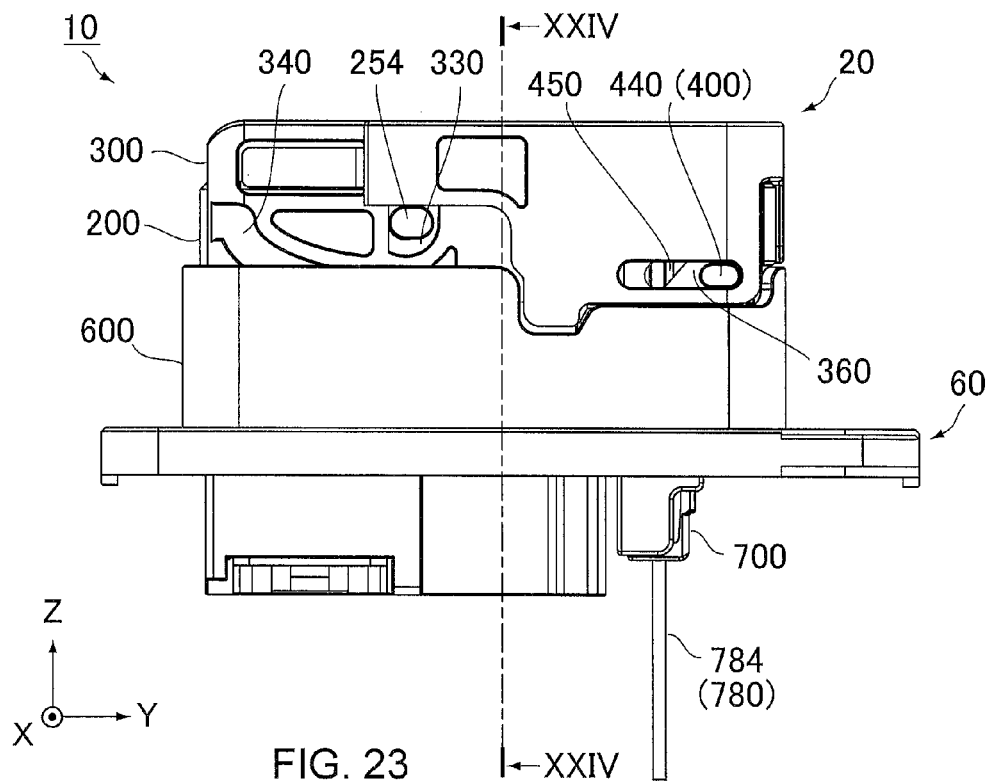
FIG. 23 is a side view showing the connector device of FIG. 22.

As can be seen from FIGS. 8 and 23, the slidable protrusion 440 is movable between opposite ends of the slide channel 360 in the longitudinal direction. In other words, the second operation member 400 is supported by the first operation member 300 to be locatable at each of the second initial position and a second displaced position (the position shown in FIG. 23). The second operation member 400 according to the present embodiment is movable in slide relative to the first operation member 300 between the second initial position and the second displaced position.

As shown in FIG. 7, the second operation member 400 has a second handle portion 410 and two spring portions 412. The second handle portion 410 is located at the middle of the coupling portion 408 in the X-direction. The second handle portion 410 has a shape easily operatable, for example, by a finger. Each of the spring portions 412 extends from the second handle portion 410 to the lock lever 420 along the sidewall 402. In other words, the spring portions 412 couple the second handle portion 410 and the lock lever 420 with each other. Each of the spring portions 412 is resiliently deformable along the sidewall 402. When the lock lever 420 is pushed into a space located between the two sidewalls 402, each of the spring portions 412 is resiliently deformed in the YZ-plane.

The second operation member 400 has two second locked portions 424. In detail, the lock lever 420 is formed with two protrusions 422. Each of the protrusions 422 protrudes outward in the X-direction from the lock lever 420. The second locked portion 424 according to the present embodiment is a surface formed on the protrusion 422. The second locked portion 424 is perpendicular to the longitudinal direction of the first operation member 300 under a state where the second operation member 400 is supported by the first operation member 300 (see FIG. 27). The lock lever 420 has two received portions 426. Each of the received portions 426 protrudes outward in the X-direction from the lock lever 420.

The second locked portions 424 are movable by moving the lock lever 420. In detail, the second locked portions 424 according to the present embodiment are resiliently supported by the spring portions 412, respectively, to be movable in a third predetermined direction (the positive Y-direction under a state shown in FIG. 7) perpendicular to the longitudinal direction of the first operation member 300. The received portion 426 is located between the spring portion 412 and the second locked portion 424 in the longitudinal direction of the first operation member 300. Accordingly, the received portions 426 are moved in the third predetermined direction when the second locked portions 424 are moved in the third predetermined direction.

The second operation member 400 has two receiving portions 472. In detail, each of the sidewalls 402 is formed with a hole 470. The hole 470 pierces the sidewall 402 in the X-direction. The receiving portion 472 according to the present embodiment is an inner wall surface of the hole 470. The received portions 426 are partially located within the holes 470, respectively. Accordingly, the receiving portion 472 receives the received portion 426 which is moved in the third predetermined direction (the positive Y-direction under the state shown in FIG. 7) to stop a movement of the second locked portion 424. The received portions 426 and the receiving portions 472 can prevent the lock lever 420 from being pushed by an excessive force to be damaged.

As shown in FIGS. 6 and 7, each of the sidewalls 402 is provided with a spring portion 430, a second operating portion (second cam groove) 450 and a ditch 460.

The spring portion 430 is resiliently deformable in the X-direction. The spring portion 430 is provided with a second regulated portion 432 at an end thereof. The second regulated portion 432 according to the present embodiment is a surface perpendicular to the longitudinal direction of the first operation member 300. The second regulated portion 432 is resiliently supported by the spring portion 430 to be movable in a second predetermined direction (inward in the X-direction) perpendicular to the longitudinal direction of the first operation member 300. As shown in FIGS. 1 and 11, when the second operation member 400 is located at the second initial position, the second regulated portion 432 is located toward the negative Z-side of the second regulation portion 352 in the longitudinal direction of the first operation member 300.

As shown in FIGS. 1, 6 and 7, the second operating portion 450 according to the present embodiment is a ditch piercing the sidewall 402 in the X-direction. As shown in FIG. 1, under a state where the second operation member 400 is supported by the first operation member 300 which is located at the first initial position, the second operating portion 450 extends short in the negative Z-direction along the longitudinal direction of the first operation member 300, and subsequently extends long along the negative Z-direction while sloping along the positive Y-direction.

As shown in FIGS. 6 and 7, the ditch 460 according to the present embodiment is a recess formed in the outer surface 406 of the sidewall 402. Under the state where the second operation member 400 is supported by the first operation member 300, the ditch 460 extends along the longitudinal direction of the first operation member 300 (see FIG. 1). The second operation member 400 has two maintained portions 462. The maintained portion 462 according to the present embodiment is an inner wall surface of the ditch 460. The maintained portion 462 is located in the vicinity of an end (the positive Y-side end under the state shown in FIGS. 6 and 7) of the sidewall 402.

As can be seen from FIG. 1, when the first operation member 300 is located at the first initial position under a state where the second operation member 400 is located at the second initial position, the second regulation portion 352 regulates a movement of the second regulated portion 432 in a second orthogonal direction (the positive Z-direction under a state shown in FIG. 1) perpendicular to the second predetermined direction (inward in the X-direction). Accordingly, the second operation member 400 is prevented from being moved to the second displaced position.

As shown in FIG. 6, the sub-connector 500 according to the present embodiment has two sidewalls 502 and a coupling portion 508. The sidewalls 502 are located at opposite sides of the sub-connector 500 in the X-direction, respectively. Each of the sidewalls 502 extends in parallel to the YZ-plane. Each of the sidewalls 502 has an outer surface 506. The outer surface 506 is an outer surface of the sidewall 502 in the X-direction. The coupling portion 508 couples lower ends of the sidewalls 402 with each other in the X-direction.

As shown in FIG. 6, the coupling portion 508 is provided with a spring portion 510. The spring portion 510 extends upward from the coupling portion 508. The spring portion 510 is resiliently deformable in the Y-direction, especially in the negative Y-direction. The sub-connector 500 has a position adjusting portion 514. In detail, the spring portion 510 is formed with a protrusion 512 at an upper end thereof, wherein the protrusion 512 protrudes in the positive Y-direction. The protrusion 512 has an upper surface and a lower surface, wherein the upper surface extends forward while sloping downward, and the lower surface extends forward while sloping upward. The position adjusting portion 514 according to the present embodiment is the lower surface of the protrusion 512. The protrusion 512, or the position adjusting portion 514, is movable in the Y-direction, especially in the negative Y-direction, by resilient deformation of the spring portion 510.

As shown in FIGS. 6 and 14, the sub-connector 500 has a spring portion 520 which extends in the Z-direction similar to the spring portion 510. The spring portion 520 is resiliently deformable in the Y-direction, especially in the positive Y-direction. The sub-connector 500 has a position adjusting portion 524 (see FIG. 14). In detail, the spring portion 520 is formed with a protrusion 522 at an upper end thereof, wherein the protrusion 522 protrudes in the negative Y-direction. The protrusion 522 has an upper surface and a lower surface, wherein the upper surface extends rearward while sloping downward, and the lower surface extends in the XY-plane. The position adjusting portion 524 according to the present embodiment is the lower surface of the protrusion 522. The protrusion 522, or the position adjusting portion 524, is movable in the Y-direction, especially in the positive Y-direction, by resilient deformation of the spring portion 520.

As shown in FIG. 6, each of the outer surfaces 506 of the sidewalls 502 is formed with a spring portion 530. The spring portion 530 according to the present embodiment extends long in the Z-direction and is held by the outer surface 506 in a both ends fixed manner. The spring portion 530 is resiliently deformable inward in the X-direction. The sub-connector 500 has two force-applied portions 534. In detail, a middle part of the spring portion 530 in the Z-direction is formed with a protrusion 532 which protrudes outward in the X-direction. The protrusion 532 has an upper surface and a lower surface, wherein the upper surface extends outward in the X-direction while sloping downward, and the lower surface extends outward in the X-direction while sloping upward. The force-applied portion 534 according to the present embodiment is the lower surface of the protrusion 532. The protrusion 532, or the force-applied portion 534, is movable inward in the X-direction by resilient deformation of the spring portion 530.

The sub-connector 500 has two operated portions (second cam protrusions) 540 and a holder 550. The operated portions 540 are formed on the outer surfaces 506 of the sidewalls 502, respectively. The operated portion 540 has a cylindrical shape extending outward in the X-direction from the outer surface 506. The holder 550 is located between the two sidewalls 502 in the X-direction.

As shown in FIG. 6, the secondary terminal 580 according to the present embodiment has a held portion 582 and two contact portions 584. The held portion 582 is held by the holder 550 of the sub-connector 500. In other words, the sub-connector 500 has the secondary terminal 580. Each of the contact portions 584 extends downward from the holder 550 in the sub-connector 500 (see FIG. 14).

As can be seen from FIGS. 1, 6 and 14, the sub-connector 500, which holds the secondary terminal 580, is inserted into the housing 200 from below to be accommodated in the accommodation portion 220. When the sub-connector 500 is inserted into the housing 200, the sub-connector 500 is moved upward while the operated portions 540 of the sub-connector 500 are guided by the guide ditches 256 of the housing 200, respectively. As can be seen from FIG. 14, in the meantime, the protrusion 522 of the sub-connector 500 is moved in the positive Y-direction to surmount the protrusion 224 of the housing 200. Similarly, the protrusion 512 of the sub-connector 500 is moved in the negative Y-direction to surmount the protrusion 222 of the housing 200. When the protrusion 512 is located on the protrusion 222, the sub-connector 500 is accommodated in the accommodation portion 220. A position of the sub-connector 500 under this state (the position shown in FIG. 14) is referred to as a first position.

Figure 26:
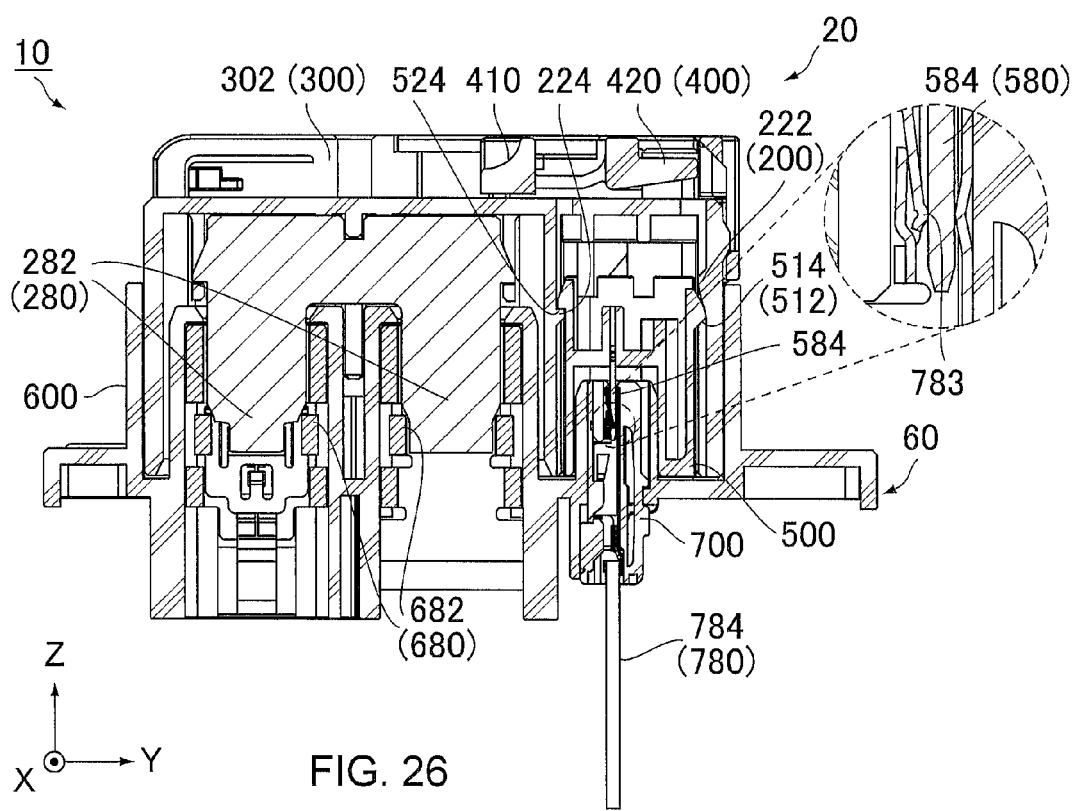
FIG. 26 is a cross-sectional view showing the connector device of FIG. 25, taken along line XXVI-XXVI, wherein the vicinity of the end of the contact portion of the secondary terminal (the part enclosed by dashed line) is enlarged to be illustrated, and the cable is illustrated without showing details and material in its cross-section.

As can be seen from FIG. 14, when the sub-connector 500 is located at the first position, the position adjusting portion 514 is supported from below by the sloping upper surface of the protrusion 222. Accordingly, the sub-connector 500 is maintained at the first position unless predetermined downward force is applied to the sub-connector 500. Moreover, even if the sub-connector 500 is moved downward, the horizontal surface (the surface in parallel to the XY-plane) of the position adjusting portion 524 is brought into contact with the horizontal upper surface of the protrusion 224 to stop the movement of the sub-connector 500. A position of the sub-connector 500 under a state where the position adjusting portion 524 is in contact with the upper surface of the protrusion 224, or the position shown in FIG. 26, is referred to as a second position. The sub-connector 500 at the second position is unmovable downward unless the spring portion 520 is resiliently deformed intentionally. Thus, the sub-connector 500 is supported by the housing 200 to be locatable at each of the first position and the second position.

As shown in FIG. 8, according to the present embodiment, when the sub-connector 500 is located at the first position, the operated portion 540 of the sub-connector 500 is located at the upper end of the guide ditch 256. In addition, the force-applied portion 534 is located in the guide ditch 256.

Hereafter, explanation is made about an operation for mating the connector 20, which is configured as described above, with the mating connector 60 and about another operation for removing the connector 20 from the mating connector 60.

As shown in FIGS. 8 to 10, when the housing 200 located at the separated position (the position shown in FIG. 8) is moved downward toward the mating housing 600, a lower end of the housing 200 is inserted into the accommodation portion 630 of the mating housing 600 (see FIG. 9). A position of the housing 200 under this state (the position shown in FIGS. 9 and 10) is referred to as a mating start position.

As shown in FIGS. 11 to 14, when the housing 200 is located at the mating start position, ends of the two contact portions 282 of the primary terminal 280 is inserted in the two receivers 684 of the mating primary terminals 680, respectively. However, the contact portion 282 is not in contact with the mating primary terminal 680. In other words, the primary terminal 280 is not electrically connected with the mating primary terminals 680.

As shown in FIG. 14, when the housing 200 is located at the mating start position, the contact portions 584 of the secondary terminal 580 are located above the mating sub-connector 700. Accordingly, the secondary terminal 580 is not electrically connected with the mating secondary terminal 780.

Figure 15:
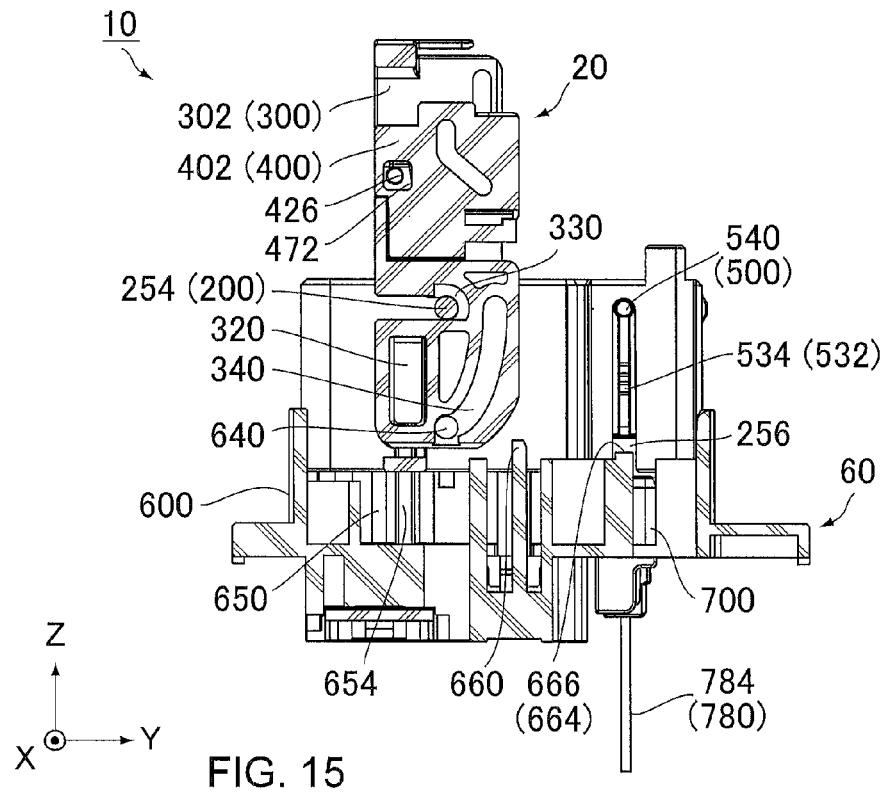
FIG. 15 is a cross-sectional view showing the connector device of FIG. 13, taken along line XV-XV.

As shown in FIG. 15, when the housing 200 is moved from the separated position to the mating start position under a state where the first operation member 300 is located at the first initial position, the two mating operated portions 640 are located in the vicinities of the openings of the first operating portions 340, respectively. In detail, the mating operated portion 640 of the mating housing 600 passes through the opening of the first operating portion 340 of the first operation member 300 to be located in the first operating portion 340. According to the present embodiment, the mating operated portion 640 is the first cam protrusion 640 while the first operating portion 340 is the first cam groove 340. When the housing 200 is located at the mating start position, the first cam protrusion 640 and the first cam groove 340 are in a first received state where the first cam protrusion 640 is received in the first cam groove 340. Under the first received state, the first cam groove 340 allows the first cam protrusion 640 to be moved in the first cam groove 340.

As shown in FIG. 15, when the housing 200 is moved to the mating start position under the state where the first operation member 300 is located at the first initial position, the two mating first releasers 654 move the two first regulated portions 322, respectively. In detail, the mating first releaser 654 pushes the arced surface of the first regulated portion 322 from below to move the first regulated portion 322 in the first predetermined direction (outward in the X-direction). The first regulated portion 322 is moved in the first predetermined direction to come off the ditch 250 of the housing 200. In other words, the mating first releaser 654 releases the first regulated portion 322 from the first regulation portion 252. Accordingly, a first mating operation is allowed, wherein the first mating operation is an operation of moving the first operation member 300 from the first initial position (see FIG. 10) to the first displaced position (see FIG. 17). The first mating operation can be performed by turning the coupling portion (first handle portion) 308 of the first operation member 300 in a turning direction (see FIG. 10).

Figure 16:
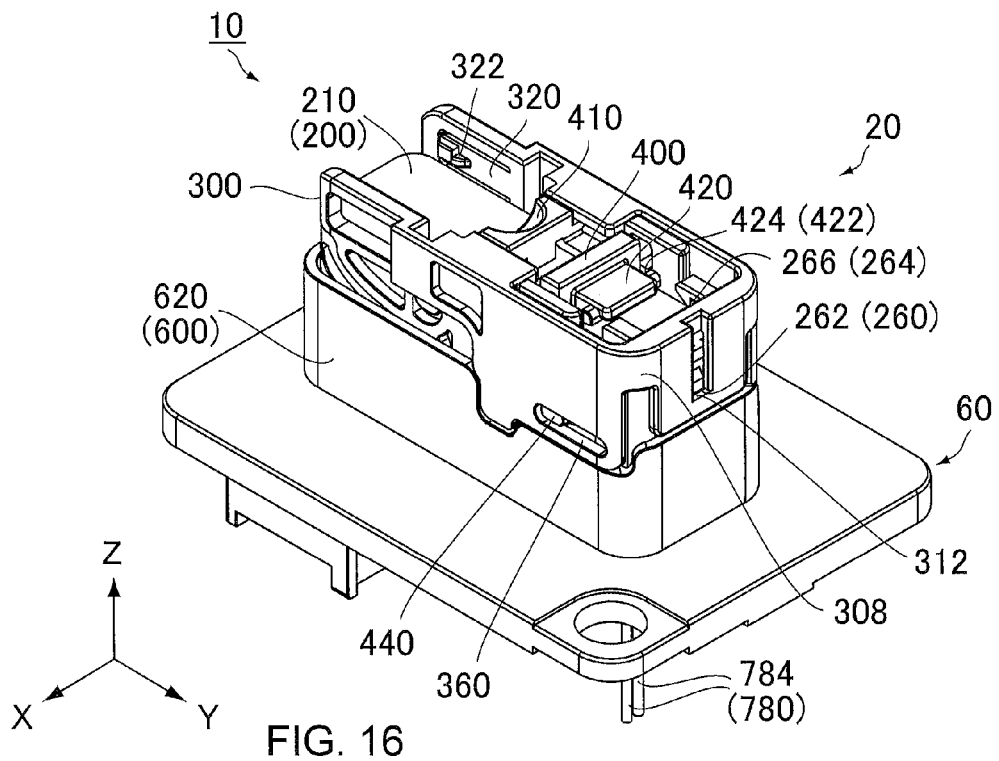
FIG. 16 is a perspective view showing the connector device of FIG. 1, wherein the housing of the connector is located at a mating position, and the second operation member is located at a second initial position.

As shown in FIGS. 10, 16 and 17, under a state where the housing 200 is located at the mating start position, the first operation member 300 is movable to the first displaced position (the position shown in FIGS. 16 and 17). In detail, when the first operation member 300 located at the first initial position (the position shown in FIG. 10) is turned in the turning direction around the fulcrum portions 330, or when the first mating operation is performed, the first operation member 300 is moved to the first displaced position. The longitudinal direction of the first operation member 300 at the first displaced position extends in parallel to the Y-direction. In other words, the first operation member 300 at the first displaced position extends long in the horizontal direction (Y-direction).

Figure 19:
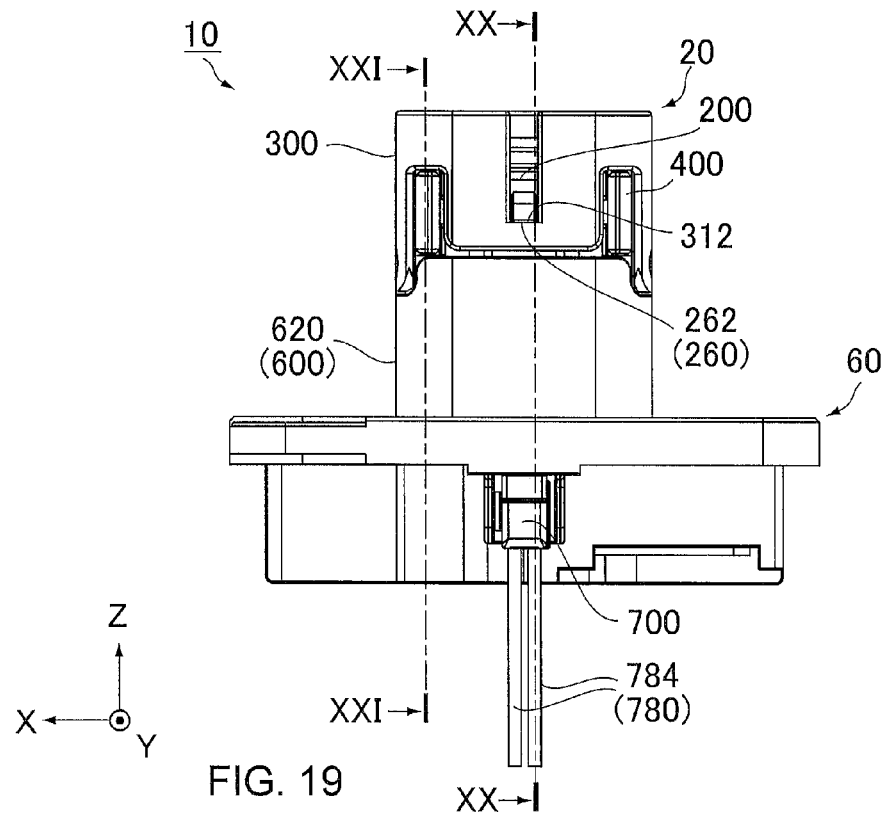
FIG. 19 is a front view showing the connector device of FIG. 16.

As shown in FIGS. 17 and 19, when the first mating operation is performed, the first locked portion 312 of the first operation member 300 surmounts the protrusion 260 of the housing 200 to be located under, or toward the negative Z-side of, the first lock portion 262. Accordingly, the first operation member 300 is maintained at the first displaced position unless the first locked portion 312 receives force in a reverse turning direction. In other words, when the first mating operation is performed, the first lock portion 262 locks the first locked portion 312 to maintain the first operation member 300 at the first displaced position.

Figure 21:
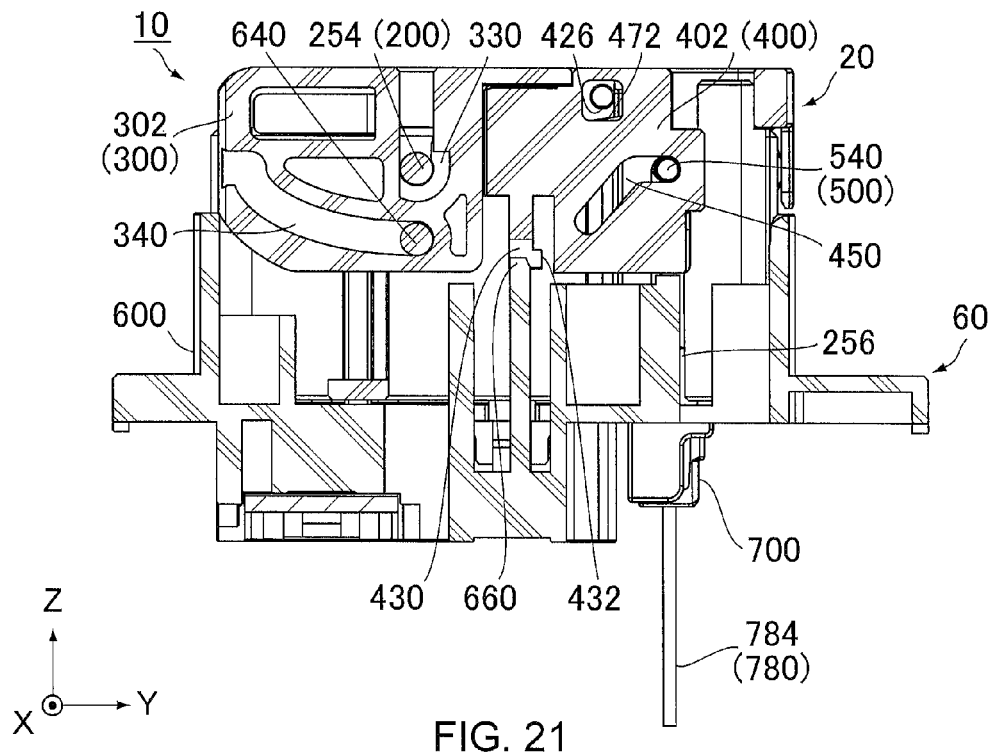
FIG. 21 is a cross-sectional view showing the connector device of FIG. 19, taken along line XXI-XXI.

As shown in FIGS. 15 and 21, when the housing 200 is located at the mating start position (the position shown in FIG. 15), the two first operating portions 340 can apply force to the two mating operated portions 640, respectively. In detail, when the housing 200 is located at the mating start position, the first cam protrusion 640 is received in the first cam groove 340 so that an inner wall surface of the first operating portion 340 is allowed to push (operate on) the mating operated portion 640. When the first mating operation is performed under this first received state, the first cam protrusion 640 is pushed by force applied from the inner wall surface of the first operating portion 340 to be moved in the first cam groove 340. In the meantime, the housing 200 is moved downward from the mating start position. When the first operation member 300 is located at the first displaced position, the first cam protrusion 640 is located at a closed end of the first cam groove 340 (see FIG. 21). A position of the housing 200 under this state (the position shown in FIG. 21) is referred to as a mating position. The housing 200 according to the present embodiment is moved from the mating start position to the mating position by a movement of the first cam protrusion 640 in the first cam groove 340. In other words, according to the present embodiment, the housing 200 is movable from the mating start position to the mating position by the first mating operation.

Figure 18:
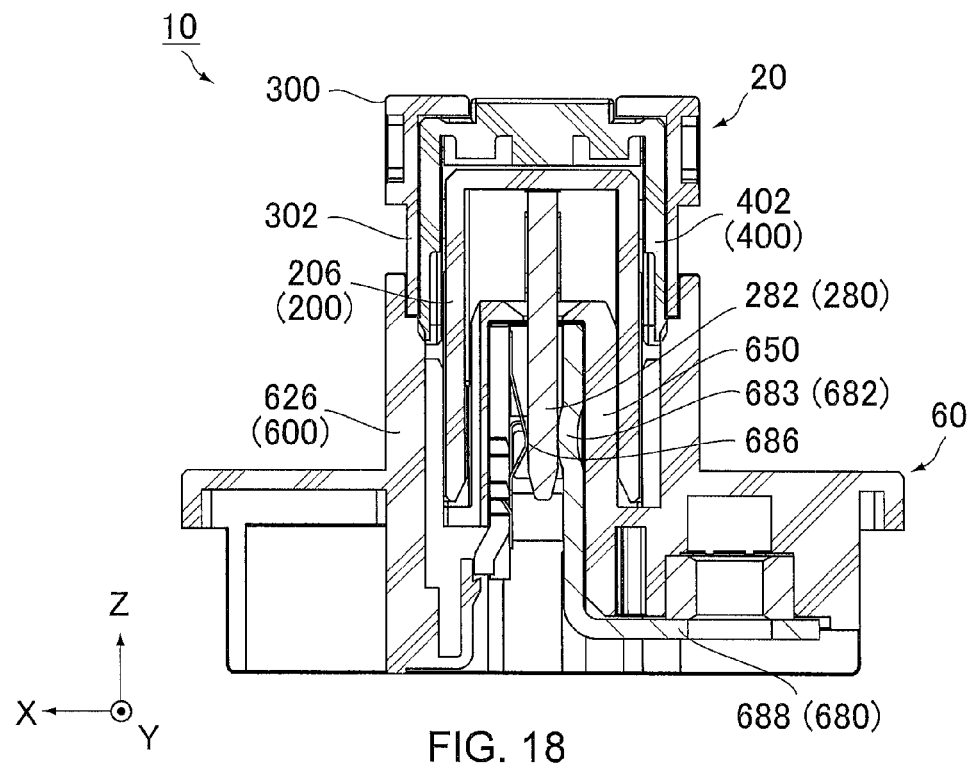
FIG. 18 is a cross-sectional view showing the connector device of FIG. 17, taken along line XVIII-XVIII.
Figure 20:
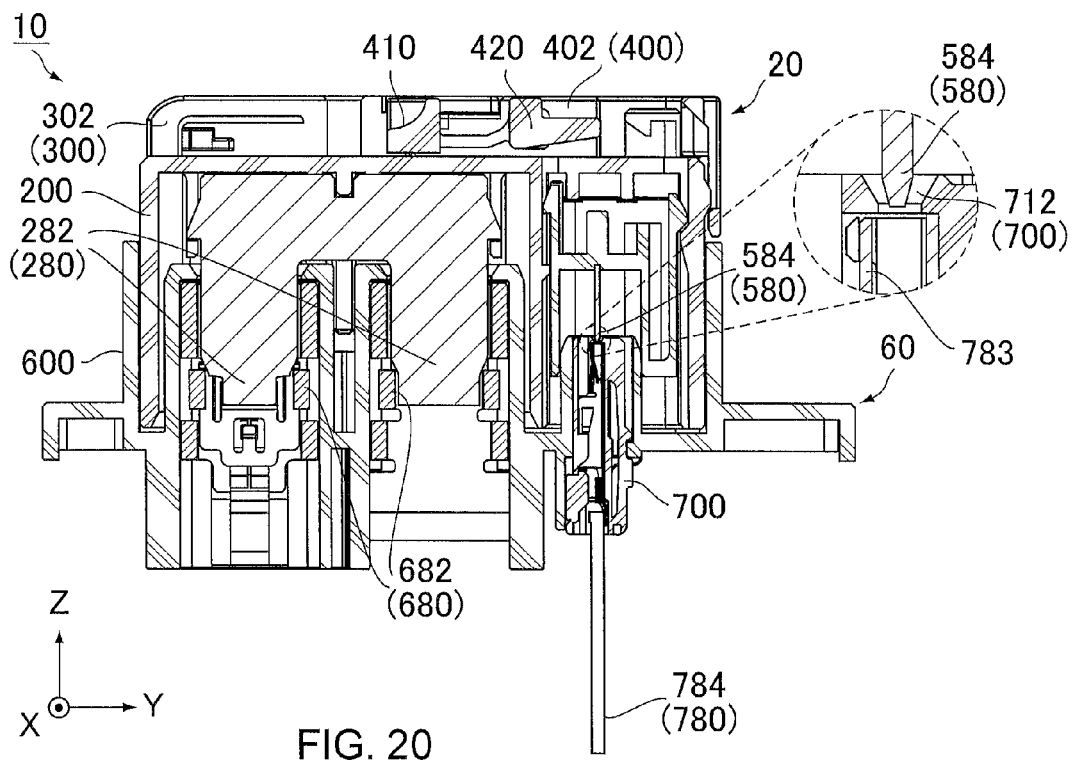
FIG. 20 is a cross-sectional view showing the connector device of FIG. 19, taken along line XX-XX, wherein the vicinity of an end of a contact portion of a secondary terminal (the part enclosed by dashed line) is enlarged to be illustrated, and the cable is illustrated without showing details and material in its cross-section.

As shown in FIGS. 18 and 20, when the housing 200 is moved to the mating position, the primary terminal 280 is also moved downward. Accordingly, the primary terminal 280 is connected to the mating primary terminals 680. According to the present embodiment, the contact portion 282 of the primary terminal 280 is sandwiched between the contact piece 686 and the contact portion 683 of the mating primary terminal 680 while resiliently deforming the contact piece 686. Accordingly, the primary terminal 280 is securely connected to the mating primary terminals 680. When the primary terminal 280 is connected to the mating primary terminals 680, the two mating primary terminals 680 (see FIG. 5) are electrically connected with each other via the primary terminal 280 (see FIG. 6). Accordingly, the power circuit (not shown) is formed.

As shown in FIG. 20, when the housing 200 is moved to the mating position, the secondary terminal 580 is also moved downward. Accordingly, ends of the two contact portions 584 of the secondary terminal 580 are inserted into the two receivers 712 of the mating sub-connector 700, respectively. However, the contact portions 584 are located above the contact portions 783. In other words, the secondary terminal 580 is not connected to the mating secondary terminals 780.

As can be seen from FIGS. 10 and 21, when the first mating operation is performed, the second operation member 400 is also moved along the turning direction. At that time, the two mating second releasers 660 move the two second regulated portions 432, respectively. In detail, the end of the spring portion 430 is also moved to be brought into contact with the mating second releaser 660 so that the spring portion 430 is resiliently deformed in the second predetermined direction (inward in the X-direction). In other words, when the first mating operation is performed, the mating second releaser 660 moves the second regulated portion 432 of the second operation member 400, which is located at the second initial position, in the second predetermined direction. Accordingly, the mating second releaser 660 releases the second regulated portion 432 from the second regulation portion 352 (see FIG. 11). As a result, a second mating operation is allowed, wherein the second mating operation is an operation of moving the second operation member 400 from the second initial position (the position shown in FIG. 21) to the second displaced position (the position shown in FIG. 22). The second mating operation can be performed by pushing the second handle portion 410 (see FIG. 20) of the second operation member 400 in the positive Y-direction.

As shown in FIG. 21, when the sub-connector 500 is located at the first position after the first mating operation, the two operated portions 540 of the sub-connector 500 are located in the second operating portions 450 of the second operation member 400, respectively. In detail, the operated portion 540 is located at a front one of opposite ends of the second operating portion 450. According to the present embodiment, the operated portion 540 is the second cam protrusion 540 while the second operating portion 450 is the second cam groove 450. When the sub-connector 500 is located at the first position after the first mating operation, the second cam protrusion 540 and the second cam groove 450 are in a second received state where the second cam protrusion 540 is received in the second cam groove 450. Under the second received state, the second cam groove 450 allows the second cam protrusion 540 to be moved in the second cam groove 450.

Figure 22:
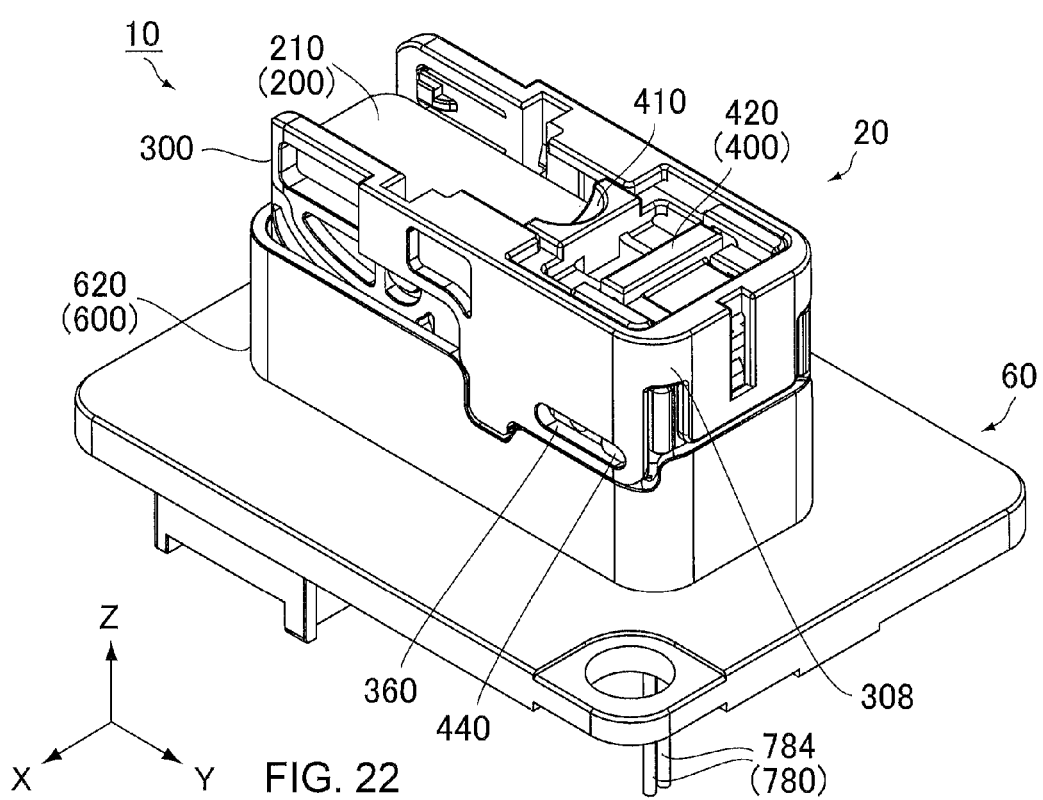
FIG. 22 is a perspective view showing the connector device of FIG. 1, wherein the housing of the connector is located at the mating position, and the second operation member is located at a second displaced position.

As shown in FIGS. 17, 22 and 23, under a state where the housing 200 is located at the mating position, the second operation member 400 is movable to the second displaced position (the position shown in FIGS. 22 and 23). In detail, when the second operation member 400 located at the second initial position (the position shown in FIG. 17) is slid in the positive Y-direction, or when the second mating operation is performed, the second operation member 400 is moved to the second displaced position.

Figure 27:
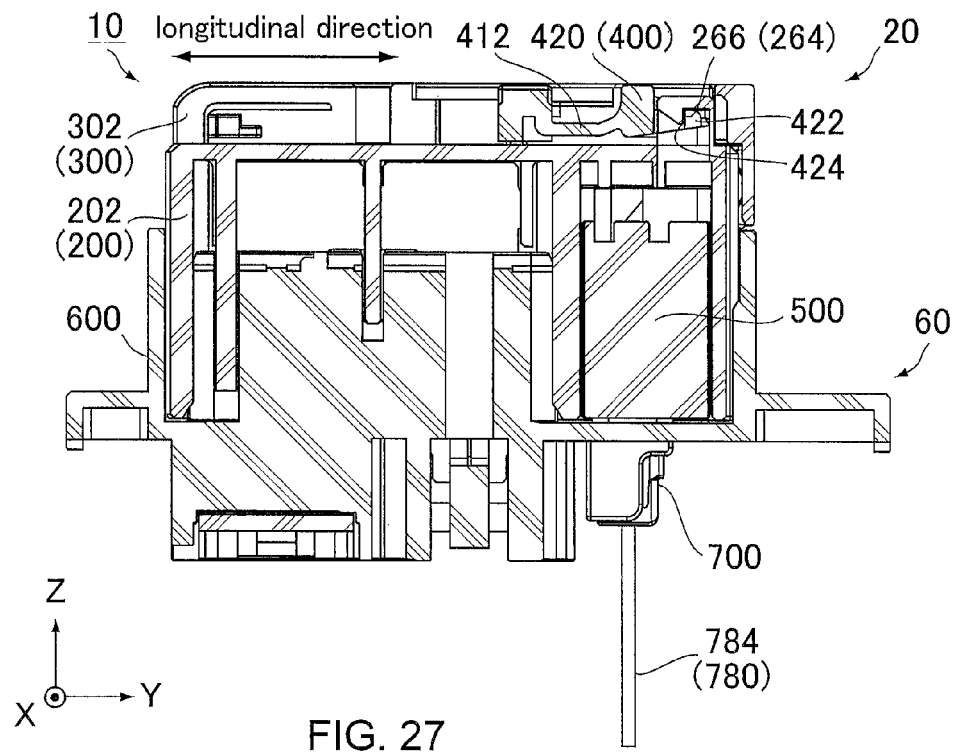
FIG. 27 is a cross-sectional view showing the connector device of FIG. 25, taken along line XXVII-XXVII.

As can be seen from FIGS. 16 and 27, when the second mating operation is performed, the two second locked portions 424 of the second operation member 400 are locked by the two second lock portions 266 of the housing 200, respectively. In detail, when the second mating operation is performed, the protrusion 422 of the second operation member 400 is moved in the positive Y-direction. The protrusion 422 is brought into abutment with the protrusion 264 of the housing 200 to be moved downward to pass through under the protrusion 264. When the second operation member 400 is located at the second displaced position, the protrusion 422 is moved upward so that the second locked portion 424 is located in front of the second lock portion 266. According to the present embodiment, the flat surface of the second locked portion 424 and the flat surface of the second lock portion 266 face each other in the Y-direction. Accordingly, the second operation member 400 is maintained at the second displaced position unless the protrusion 422 is moved downward. In other words, when the second mating operation is performed, the second lock portion 266 locks the second locked portion 424 to maintain the second operation member 400 at the second displaced position.

Figure 25:
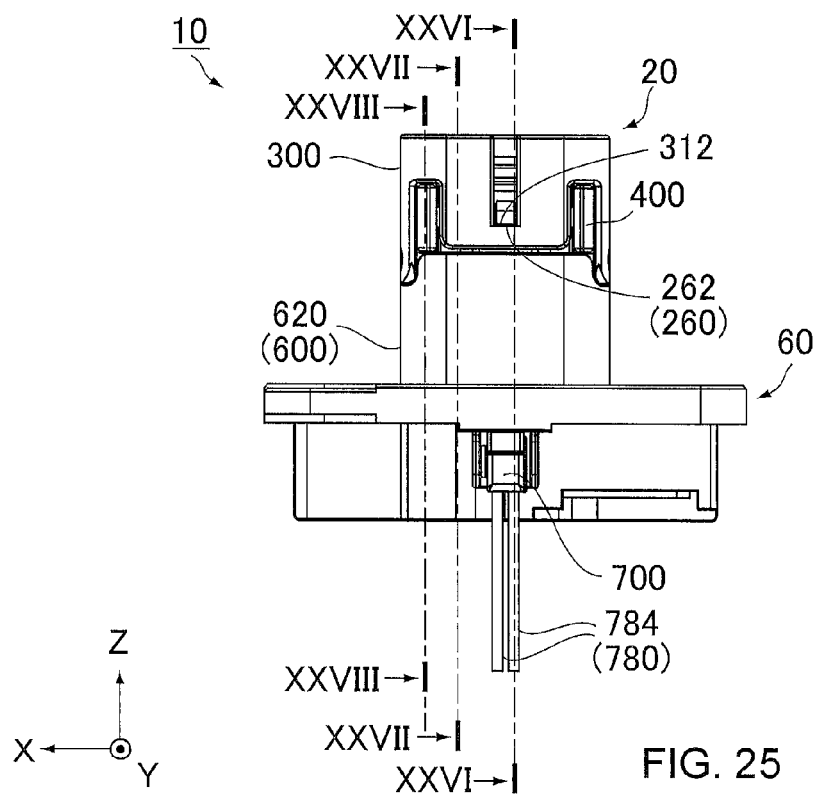
FIG. 25 is a front view showing the connector device of FIG. 22.

As shown in FIG. 25, even after the second mating operation, the first lock portion 262 locks the first locked portion 312 to maintain the first operation member 300 at the first displaced position.

Figure 28:
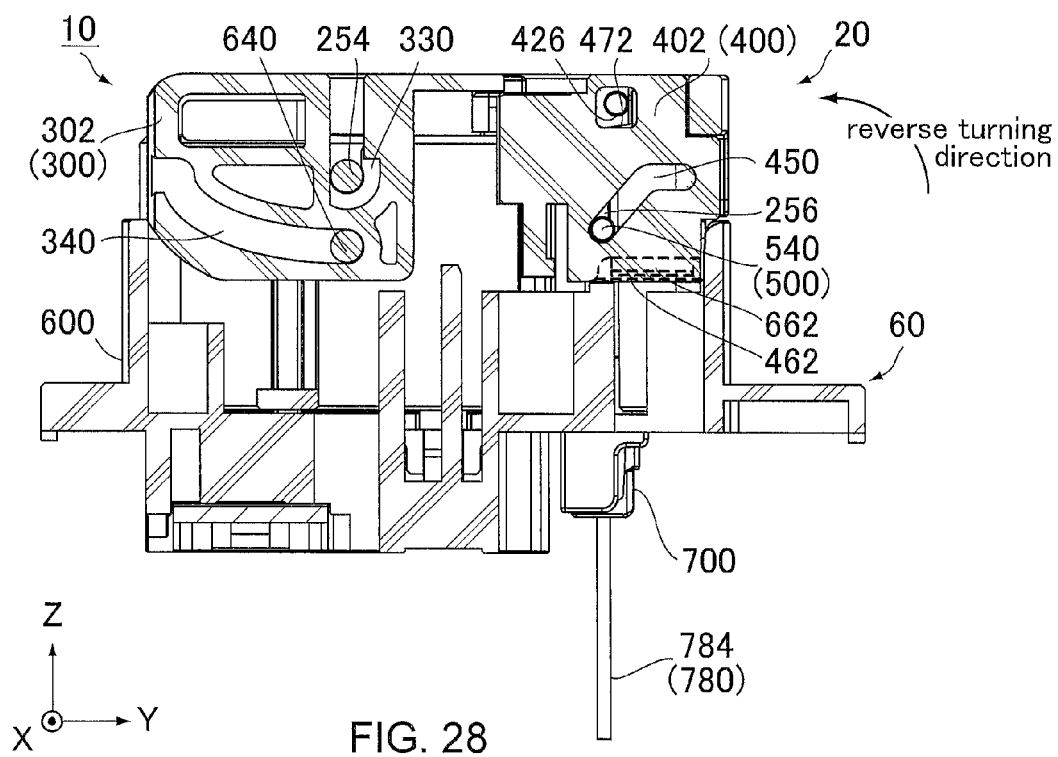
FIG. 28 is a cross-sectional view showing the connector device of FIG. 25, taken along line XXVIII-XXVIII, wherein a position of a maintained portion of the second operation member and a position of a maintaining portion of a mating housing are illustrated by dashed line.

Moreover, as can be seen from FIG. 28, when the second mating operation is performed, the two maintained portions 462 of the second operation member 400 are located under the two maintaining portions 662 of the mating housing 600, respectively. Accordingly, the first operation member 300 is prevented from being turned in the reverse turning direction. In detail, according to the present embodiment, when the first operation member 300 is moved toward the first initial position after the second mating operation, the maintaining portion 662 is brought into abutment with the maintained portion 462 to more securely maintain the first operation member 300 at the first displaced position.

As shown in FIGS. 21 and 28, when the sub-connector 500 is located at the first position (the position shown in FIG. 21) after the first operation, the two second operating portions 450 can apply force to the two operated portions 540, respectively. In detail, when the sub-connector 500 is located at the first position after the first operation, the second cam protrusion 540 is received in the second cam groove 450 so that an inner wall surface of the second operating portion 450 is allowed to push (operate on) the operated portion 540. When the second mating operation is performed under this second received state, the second cam protrusion 540 is pushed by force applied from the inner wall surface of the second operating portion 450 to be moved in the second cam groove 450. In the meantime, the sub-connector 500 is moved downward from the first position. When the second operation member 400 is located at the second displaced position (the position shown in FIG. 28), the second cam protrusion 540 is located at a lower one of the opposite ends of the second cam groove 450. At that time, the sub-connector 500 is located at the second position. The sub-connector 500 according to the present embodiment is moved from the first position to the second position by a movement of the second cam protrusion 540 in the second cam groove 450. In other words, according to the present embodiment, the sub-connector 500 is movable from the first position to the second position by the second mating operation.

As can be seen from FIGS. 14 and 26, when the sub-connector 500 is moved to the second position from the first position, the protrusion 512 is moved in the negative Y-direction to surmount the protrusion 222 of the housing 200.

Figure 24:
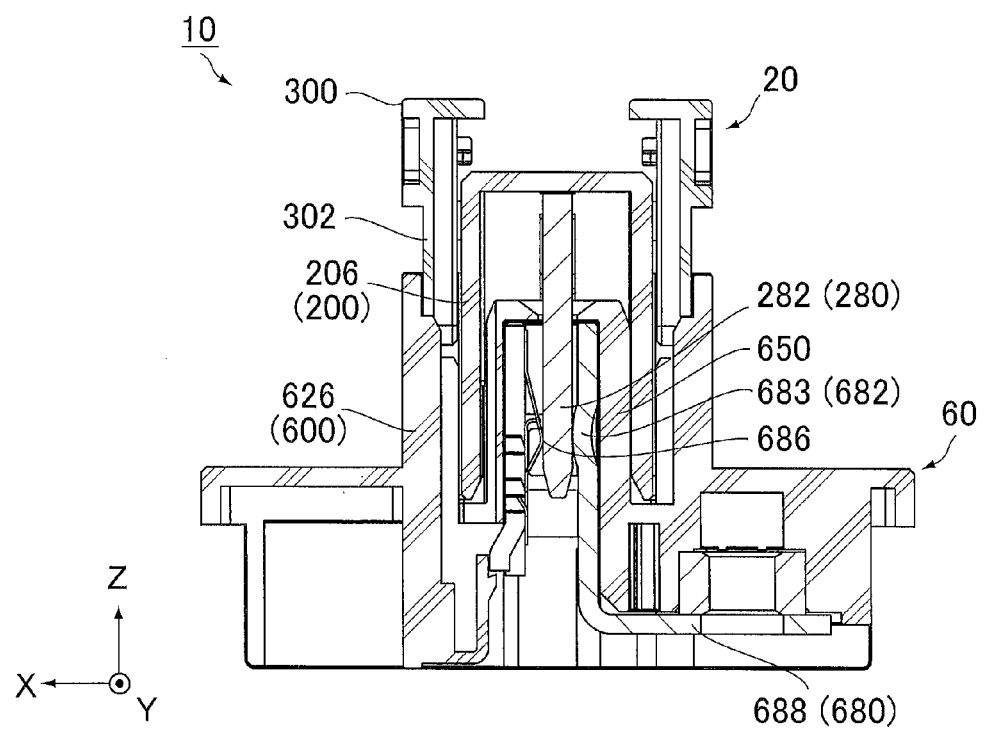
FIG. 24 is a cross-sectional view showing the connector device of FIG. 23, taken along line XXIV-XXIV.

As shown in FIGS. 24 and 26, the housing 200 is not moved by the second mating operation. Accordingly, the primary terminal 280 is connected to the mating primary terminals 680 even after the second mating operation. Thus, the power circuit (not shown) is maintained.

As shown in FIG. 26, when the second mating operation is performed subsequent to the first mating operation, the secondary terminal 580 of the sub-connector 500 is also moved downward. Accordingly, the ends of the contact portions 584 of the secondary terminal 580 are brought into contact with the contact portions 783 of the mating secondary terminals 780, respectively. In detail, the contact portion 584 is brought into contact with the contact portion 783 while resiliently deforming the contact portion 783 in the negative Y-direction. Accordingly, the secondary terminal 580 is securely connected to the mating secondary terminals 780. When the secondary terminal 580 is connected to the mating secondary terminals 780, the two mating secondary terminals 780 (see FIG. 5) are electrically connected with each other via the secondary terminal 580 (see FIG. 6). Accordingly, the switch (not shown) of the power circuit (not shown) is closed to start current flow.

The connector 20, which is mated with the mating connector 60, can be removed from the mating connector 60 as described below.

As can be seen from FIG. 27, when the lock lever 420 of the second operation member 400 is pushed downward after the second operation, the second locked portions 424 are moved in the third predetermined direction (the negative Z-direction in FIG. 27). When the second locked portions 424 are moved in the third predetermined direction, the second locked portions 424 are unlocked from the second lock portions 266, respectively. Accordingly, the second operation member 400 is movable from the second displaced position to the second initial position.

As shown in FIG. 20, when the second operation member 400 is moved to the second initial position, the sub-connector 500 is moved from the second position to the first position. Accordingly, the secondary terminal 580 is moved upward to cut the electrical connection between the secondary terminal 580 and the mating secondary terminals 780. As a result, the current flow is stopped.

As can be seen from FIGS. 21 and 28, when the second operation member 400 is moved to the second initial position, the maintained portions 462 are apart from the maintaining portions 662, respectively. As shown in FIG. 19, at that time, the first operation member 300 is maintained at the first displaced portion only by the lock of the first lock portion 262 with the first locked portion 312.

As can be seen from FIG. 17, when the first locked portion 312 is moved outward in the Y-direction, the first locked portion 312 is unlocked from the first lock portion 262. Subsequently, when the first operation member 300 is turned around the fulcrum portions 330 in the reverse turning direction, the first operation member 300 is moved from the first displaced position to the first initial position. As shown in FIG. 8, according to the present embodiment, the fulcrum portion 330 of the first operation member 300 is located between the first handle portion 308 and the first operating portion 340. Moreover, a distance between the fulcrum portion 330 and the first handle portion 308 is larger than another distance between the fulcrum portion 330 and the first operating portion 340. Accordingly, the first operation member 300 is turnable in the reverse turning direction by relatively small force even when the primary terminal 280 is securely connected to the mating primary terminals 680 (see FIG. 18). Moreover, the first operation member 300 is also turnable in the turning direction by relatively small force.

As can be seen from FIG. 11, when the first operation member 300 is moved to the first initial position, the housing 200 is moved from the mating position to the mating start position. Accordingly, the primary terminal 280 is moved upward to cut the connection between the primary terminal 280 and the mating primary terminals 680. As a result, the power circuit (not shown) is cut off.

As described above, according to the present embodiment, when the connector 20 is to be mated with the mating connector 60, the operation of the first operation member 300 connects the primary terminal 280 of the housing 200 to the mating primary terminals 680, and subsequently, the operation of the second operation member 400 connects the secondary terminal 580 of the sub-connector 500 to the mating secondary terminals 780. Moreover, the operation of the second operation member 400 disconnects the secondary terminal 580 from the mating secondary terminals 780, and subsequently, the operation of the first operation member 300 disconnects the primary terminal 280 from the mating primary terminals 680. Moreover, the first operation member 300 that operates the housing 200 holding the primary terminal 280 is other than the second operation member 400 that operates the sub-connector 500 holding the secondary terminal 580. Accordingly, it is possible to have enough time between the operation of the housing 200 and the operation of the sub-connector 500. In other words, because the stop of the current flow and the cutoff of the power circuit (not shown) cannot be performed in a rush, it is possible to more surely obtain enough time after the disconnection of the secondary terminal 580 until the disconnection of the primary terminal 280.

As shown in FIG. 2, according to the present embodiment, the mating housing 600 is provide with the keys 656. Accordingly, the connector 20 is prevented from being mated in a reverse posture in the front-rear direction.

As can be seen from FIG. 15, when the housing 200 is located at the mating start position, the force-applied portions 534 are located above the push-back portions 666, respectively, even if the sub-connector 500 is located at the second position. Accordingly, during the first mating operation, the push-back portions 666 push the force-applied portions 534 upward, respectively, to move the sub-connector 500 to the first position. In other words, according to the present embodiment, during the first mating operation, the push-back portions 666 push the sub-connector 500 back to the first position even if the sub-connector 500 is not located at the first position. Accordingly, the second mating operation can be performed subsequent to the first mating operation.

The connector device 10, which is formed as described above, can be modified variously.

For example, according to the present embodiment, the mating operated portion 640 is the first cam protrusion while the first operating portion 340 is the first cam groove. However, the mating operated portion 640 may be the first cam groove while the first operating portion 340 may be the first cam protrusion. In other words, it is enough that one of the mating operated portion 640 and the first operating portion 340 is the first cam protrusion while a remaining one is the first cam groove.

Similarly, the operated portion 540 may be the second cam groove while the second operating portion 450 may be the second cam protrusion. In other words, it is enough that one of the operated portion 540 and the second operating portion 450 is the second cam protrusion while a remaining one is the second cam groove.

Moreover, the housing 200 may be moved from the mating start position to the mating position by a first mating operation which does not use any cam structure. Similarly, the sub-connector 500 may be moved from the first position to the second position by a second mating operation which does not use any cam structure.

Moreover, the moving method of the first operation member 300 and the moving direction of the housing 200 under the first mating operation may be modified variously. For example, the first mating operation may not turn but slide the first operation member 300. Similarly, the moving method of the second operation member 400 and the moving direction of the sub-connector 500 under the second mating operation may be modified variously. For example, the second mating operation may not slide but turn the second operation member 400.

Moreover, the two contact portions 282 of the primary terminal 280 may be connected with each other via a fuse. According to the present embodiment, because the housing 200 includes the cover 210, the fuse can be covered. Accordingly, an operator can be prevented from being electrically shocked or getting burned.

The present application is based on a Japanese patent application of JP2013-182315 filed before the Japan Patent Office on Sep. 3, 2013, the contents of which are incorporated herein by reference.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A connector device comprising a connector and a mating connector, wherein:
the connector is mateable with the mating connector and removable from the mating connector;
the mating connector includes a mating housing, a mating primary terminal and a mating secondary terminal;
the mating primary terminal and the mating secondary terminal are held by the mating housing;
the connector includes a housing, a primary terminal, a sub-connector, a first operation member and a second operation member other than the first operation member;
the primary terminal is held by the housing;
the sub-connector includes a secondary terminal;
the sub-connector is supported by the housing to be locatable at each of a first position and a second position;
the first operation member is supported by the housing to be locatable at each of a first initial position and a first displaced position;
the second operation member is attached to and supported by the first operation member to be locatable at each of a second initial position and a second displaced position;
when a first mating operation is performed, the second operation member is moved together with the first operation member, the housing is moved to a mating position, and the primary terminal is connected to the mating primary terminal, wherein the first mating operation is an operation of moving the first operation member from the first initial position to the first displaced position; and
when a second mating operation is performed subsequent to the first mating operation, the second operation member is moved relative to the first operation member, the sub-connector is moved to the second position from the first position, and the secondary terminal is connected to the mating secondary terminal, wherein the second mating operation is an operation of moving the second operation member from the second initial position to the second displaced position.

2. The connector device as recited in claim 1, wherein:
the mating housing is provided with a mating operated portion;
the first operation member is provided with a fulcrum portion and a first operating portion;
the first operation member is movable in turn around the fulcrum portion between the first initial position and the first displaced position;

when the housing is located at a mating start position, the first operating portion is allowed to operate on the mating operated portion, and the housing is movable to the mating position by the first mating operation;

the sub-connector is provided with an operated portion;

the second operation member is provided with a second operating portion;

the second operation member is movable in slide relative to the first operation member between the second initial position and the second displaced position; and when the sub-connector is located at, the first position after the first mating operation, the second operating portion is allowed to operate on the operated portion, and the sub-connector is movable to the second position by the second mating operation.

3. The connector device as recited in claim 2, wherein:

one of the mating operated portion and the first operating portion is a first cam protrusion while a remaining one is a first cam groove;

under a first received state where the first cam protrusion is received in the first cam groove, the first operating portion is allowed to operate on the mating operated portion;

when the first mating operation is performed under the first received state, the first cam protrusion is moved in the first cam groove, and the housing is moved from the mating start position to the mating position;

one of the operated portion and the second operating portion is a second cam protrusion while a remaining one is a second cam groove;

under a second received state where the second cam protrusion is received in the second cam groove, the second operating portion is allowed to operate on the operated portion; and when the second mating operation is performed under the second received state, the second cam protrusion is moved in the second cam groove, and the sub-connector is moved from the first position to the second position.

4. The connector device as recited in claim 3, wherein:

the mating operated portion is the first cam protrusion while the first operating portion is the first cam groove; and the operated portion is the second cam protrusion while the second operating portion is the second cam groove.

5. The connector device as recited in claim 2, wherein:

the first operation member is provided with a first handle portion;

the fulcrum portion is located between the first handle portion and the first operating portion; and a distance between the fulcrum portion and the first handle portion is larger than another distance between the fulcrum portion and the first operating portion.

6. The connector device as recited in claim 2, wherein:

the mating housing has a mating first releaser;

the housing has a first regulation portion;

the first operation member has a first regulated portion;

the first regulated portion is supported to be movable in a first predetermined direction;

when the housing is located at a separated position where the housing is separated from the mating housing under a state where the first operation member is located at the first initial position, the first regulation portion regulates a movement of the first regulated portion in a first predetermined plane perpendicular to the first predetermined direction to prevent the first operation member from being moved to the first displaced position; and when the housing is moved to the mating start position under the state where the first operation member is located at the first initial position, the mating first releaser moves the first regulated portion in the first predetermined direction to release the first regulated portion from the first regulation portion.

7. The connector device as recited in claim 2, wherein:

the mating housing has a mating second releaser;

the first operation member has a second regulating portion;

the second operation member has a second regulated portion;

the second regulated portion is supported to be movable in a second predetermined direction;

when the first operation member is located at the first initial position under a state where the second operation member is located at the second initial position, the second regulation portion regulates a movement of the second regulated portion in a second orthogonal direction perpendicular to the second predetermined direction to prevent the second operation member from being moved to the second displaced position; and when the first mating operation is performed, the mating second releaser moves the second regulated portion of the second operation member, which is located at the second initial position, in the second predetermined direction to release the second regulated portion from the second regulation portion to enable the movement of the second regulated portion in the second orthogonal direction.

8. The connector device as recited in claim 1, wherein:

the housing has a first lock portion;

the first operation member has a first locked portion; and when the first mating operation is performed, the first lock portion locks the first locked portion to maintain the first operation member at the first displaced position.

9. The connector device as recited in claim 1, wherein:

the mating housing has a maintaining portion;

the second operation member has a maintained portion; and when the first operation member is moved toward the first initial position after the second mating operation, the maintaining portion is brought into abutment with the maintained portion to maintain the first operation member at the first displaced position.

10. The connector device as recited in claim 1, wherein:

the housing has a second lock portion;

the second operation member has a second locked portion; and when the second mating operation is performed, the second lock portion locks the second locked portion to maintain the second operation member at the second displaced position.

11. The connector device as recited in claim 10, wherein:

the second locked portion is resiliently supported to be movable in a third predetermined direction; and when the second locked portion is moved in the third predetermined direction after the second mating operation, the second locked portion is unlocked from the second lock portion.

12. The connector device as recited in claim 11, wherein:

the second operation member has a receiving portion and a received portion;

the received portion is moved in the third predetermined direction when the second locked portion is moved in the third predetermined direction; and the receiving portion receives the received portion which is moved in the third predetermined direction to stop a movement of the second locked portion.

13. The connector device as recited in claim 1, wherein:

the mating housing has a push-back portion; and during the first mating operation, the push-back portion pushes the sub-connector back to the first position even if the sub-connector is not located at the first position.

* * * * *